(12) United States Patent
Malakapalli et al.

(10) Patent No.: US 9,009,329 B2
(45) Date of Patent: Apr. 14, 2015

(54) PLATFORM FOR ENABLING TERMINAL SERVICES VIRTUALIZATION

(75) Inventors: Meher Malakapalli, Sammamish, WA (US); Ido Ben-Shachar, Kirkland, WA (US); Artem Belkine, Renton, WA (US); Ashwin Palekar, Sammamish, WA (US); Niraj Agarwala, Redmond, WA (US); Mahadev Alladi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1126 days.

(21) Appl. No.: 12/277,723

(22) Filed: Nov. 25, 2008

(65) Prior Publication Data

US 2010/0131654 A1    May 27, 2010

(51) Int. Cl.
*G06F 15/16*      (2006.01)
*H04L 29/08*      (2006.01)

(52) U.S. Cl.
CPC ............ *H04L 67/08* (2013.01); *H04L 67/2814* (2013.01); *H04L 67/2819* (2013.01); *H04L 67/1006* (2013.01); *H04L 67/14* (2013.01); *H04L 67/1002* (2013.01); *H04L 67/142* (2013.01)

(58) Field of Classification Search
USPC ......................................................... 709/227
See application file for complete search history.

(56) References Cited

U.S. PATENT DOCUMENTS

| | | | |
|---|---|---|---|
| 6,922,724 B1 * | 7/2005 | Freeman et al. ............... | 709/223 |
| 7,243,138 B1 * | 7/2007 | Majkut et al. .................. | 709/219 |
| 7,334,039 B1 * | 2/2008 | Majkut et al. .................. | 709/229 |
| 7,849,192 B2 * | 12/2010 | Brandstatter .................. | 709/226 |
| 8,375,127 B1 * | 2/2013 | Lita ................................ | 709/226 |
| 2004/0088377 A1 | 5/2004 | Henriquez | |
| 2005/0010926 A1 * | 1/2005 | Narayanaswamy et al. .. | 719/310 |
| 2006/0069797 A1 * | 3/2006 | Abdo et al. .................... | 709/231 |
| 2006/0195895 A1 * | 8/2006 | Ben-Shachar et al. .......... | 726/11 |
| 2006/0200453 A1 * | 9/2006 | Santrosyan et al. .............. | 707/3 |
| 2007/0168525 A1 * | 7/2007 | DeLeon et al. ............... | 709/228 |
| 2007/0174410 A1 | 7/2007 | Croft et al. | |
| 2007/0192329 A1 * | 8/2007 | Croft et al. ....................... | 707/10 |
| 2007/0198656 A1 * | 8/2007 | Mazzaferri et al. ........... | 709/218 |
| 2007/0204153 A1 | 8/2007 | Tome et al. | |
| 2007/0233869 A1 * | 10/2007 | Jodh et al. ...................... | 709/226 |
| 2007/0237077 A1 * | 10/2007 | Patwardhan et al. ......... | 370/230 |
| 2007/0239859 A1 | 10/2007 | Wilkinson et al. | |
| 2007/0244966 A1 * | 10/2007 | Stoyanov et al. ............. | 709/204 |

(Continued)

OTHER PUBLICATIONS

Chitnis, P.V., "Terminal Services Team Blog," http://blogs.msdn.com/ts/, Sep. 2, 2008, 1-17.

(Continued)

*Primary Examiner* — Hamza Algibhah
*Assistant Examiner* — James Edwards
(74) *Attorney, Agent, or Firm* — Ben Tabor; David Andrews; Micky Minhas

(57) ABSTRACT

Disclosed are techniques for providing a platform and application program interface (API) that leverages a terminal services session broker infrastructure to support third party plug-in applications. In a typical scenario, when a user requests for a connection to access third party plug-in applications, the application program interface may interact with the session broker process to identify sessions or suitable servers to which the user can be connected. The user may access the third party plug-in applications through the identified sessions or suitable servers.

20 Claims, 21 Drawing Sheets

(56) References Cited

U.S. PATENT DOCUMENTS

| | | | |
|---|---|---|---|
| 2008/0082666 A1* | 4/2008 | Brandstatter | 709/226 |
| 2008/0235624 A1* | 9/2008 | Murata | 715/825 |
| 2009/0287772 A1* | 11/2009 | Stone et al. | 709/203 |
| 2009/0313338 A1* | 12/2009 | Lankford et al. | 709/206 |
| 2011/0167159 A1* | 7/2011 | Bethlehem et al. | 709/226 |

OTHER PUBLICATIONS

Madden, B., "When to Use VDI, When to Use Server-based Computing, and How the Citrix Ardence Dynamic Desktop Fits into All This," http://www.brianmadden.com/content/article/When-to-use-VDI-when-to-use-server-based-computing-and-how-the-Citrix-Ardence-dynamic-desktop-fits-into-all-this, Mar. 15, 2007, 1-10.

Wolf, C., "Virtual Server RDP Administration Annoyance," http://virtualization.com/guides/2006/03/22/virtual-server-rdp-administration-annoyance/, Mar. 22, 2006, 1-6.

Chappell, D., "Virtualization for Windows: A Technology Overview," http://download.microsoft.com/download/0/A/C/0AC57003-473C-4F9A-84B0-8ADEF6ACE753/MS_Virtualization_Overview_v1.1.doc, Jul. 2007, 1-25.

Rouse, P., "Virtual Desktop Infrastructure (VDI) Overview," http://www.msterminalservices.org/articles/Virtual-Desktop-Infrastructure-Overview.html, Dec. 20, 2006, 1-5.

* cited by examiner

PLATFORM FOR ENABLING TERMINAL SERVICES VIRTUALIZATION

CROSS-REFERENCE

This application is related to the subject matter disclosed in the following commonly assigned applications, the entirety of which are hereby incorporated by reference herein: U.S. patent application Ser. No. 12/114,582 "Session Broker Extensibility Application Program Interface" filed on May 2, 2008 and U.S. patent application Ser. No. 11/771,921 "Virtual Desktop Integration with Terminal Services" filed on Jun. 29, 2007.

BACKGROUND

Remote computing systems may enable users to access resources hosted by the remote computing systems. Servers on the remote computing systems can execute programs and transmit signals indicative of a user interface to clients that can connect by sending signals over a network conforming to a communication protocol such as the TCP/IP protocol. Each connecting client may be provided a session, i.e., an execution environment that includes a set of resources. Each client can transmit signals indicative of user input to the server and the server can apply the user input to the appropriate session. The clients may use protocols such as the Remote Desktop Protocol (RDP) to connect to a server resource. Protocols such as RDP typically handle graphics, device traffic such as USB, printer keyboard and mouse and in addition, virtual channels for application between server and a client. The terminal server hosts client sessions which can be in hundreds in a typical server configuration.

Enabling remote connections to centralized desktops hosted in virtual machines is commonly used for centralized computing scenarios. Deployment of virtual desktops requires load balancing of host computers that host virtual machines, placement of virtual machines on the hosts, and properly orchestrating the startup, wake up, and preparation of virtual machines for receiving connections. Thus it would be advantageous to provide an infrastructure that enables a user to individually customize each of the above steps to provide fast and efficient load balancing, placement, and orchestration of virtual machines using services such as RDP.

SUMMARY

Methods and systems are disclosed for providing terminal services virtualization (TSV) that enables remote desktop connections to virtual desktops. In the disclosed TSV platform, the balancing, placement, and orchestration steps may be performed seamlessly from a single remote desktop client connection to give the end user the same experience as connecting to a physical desktop. In various embodiments, such a platform may include an infrastructure including one or more APIs that provide interfaces to enable terminal services virtualization. The platform may include a component called a session broker that brokers remote desktop connections to final destinations by communicating with various plug-ins via the APIs and TSV infrastructure.

The disclosed methods and systems provide extensibility to allow plug-ins to perform or optimize individual steps such as load balancing, placement, and orchestration. The disclosed methods and systems may further allow third parties to implement resource and filter plug-ins that specialize in individual tasks such as placement and manage one or more farms of virtual machines and their relationship to the session broker.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Computing Environments in General Terms

Figure 1:
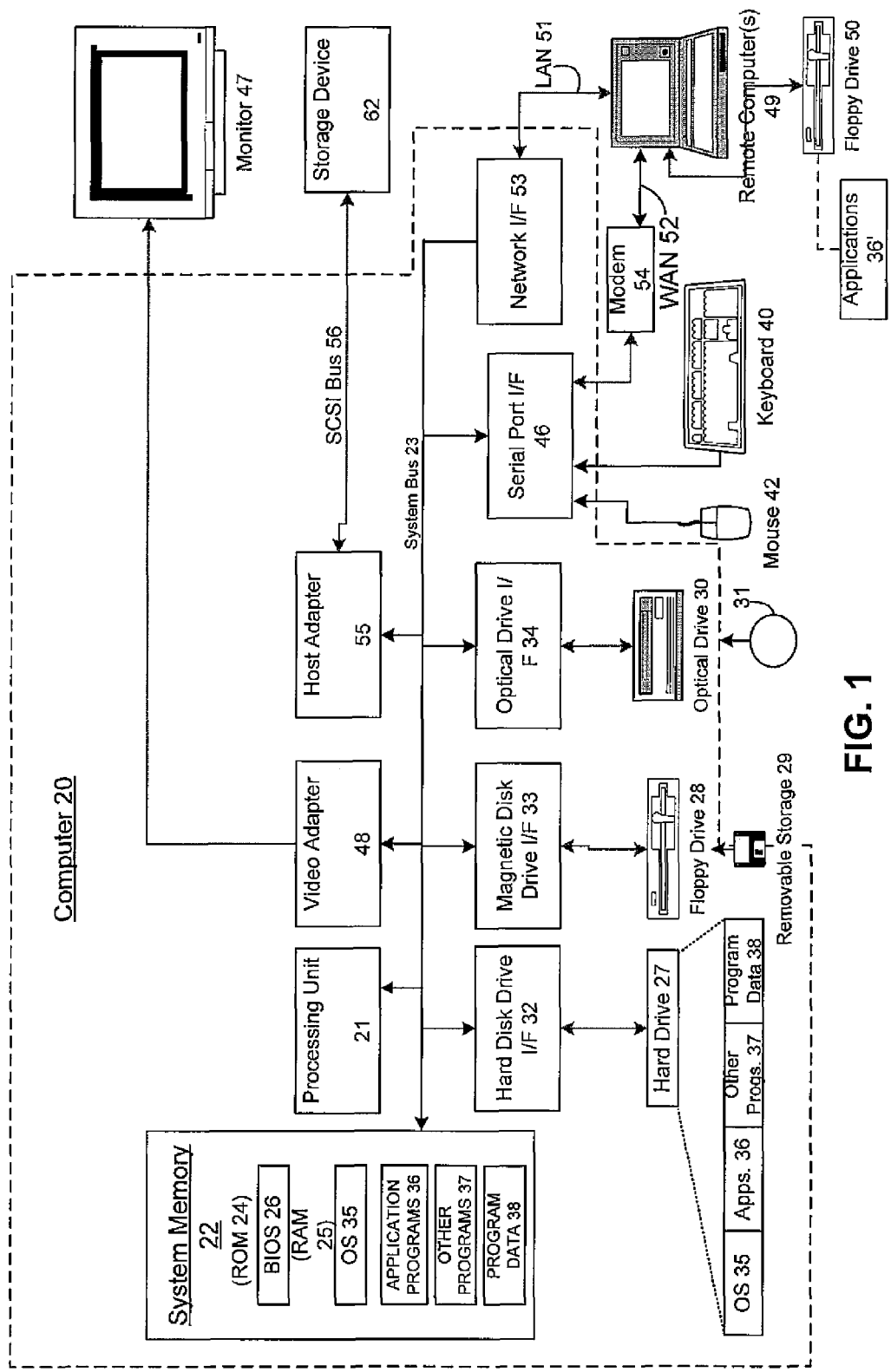
FIG. 1 depicts an example computer system wherein aspects of the present disclosure can be implemented.

Certain specific details are set forth in the following description and figures to provide a thorough understanding of various embodiments of the presently disclosed subject matter. Certain well-known details often associated with computing and software technology are not set forth in the following disclosure to avoid unnecessarily obscuring the various embodiments of the disclosed subject matter. Further, those of ordinary skill in the relevant art will understand that they can practice other embodiments of the disclosed subject matter without one or more of the details described below. Finally, while various methods are described with reference to steps and sequences in the following disclosure, the description as such is for providing a clear implementation of embodiments of the disclosed subject matter, and the steps and sequences of steps should not be taken as required to practice this subject matter.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosed subject matter. In the case of program code execution on programmable computers, the computing device generally includes a processor, a storage medium readable by the processor (including volatile and nonvolatile memory and/or storage elements), at least one input device, and at least one output device. One or more programs that may implement or utilize the processes described in connection with the disclosed subject matter, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 2:
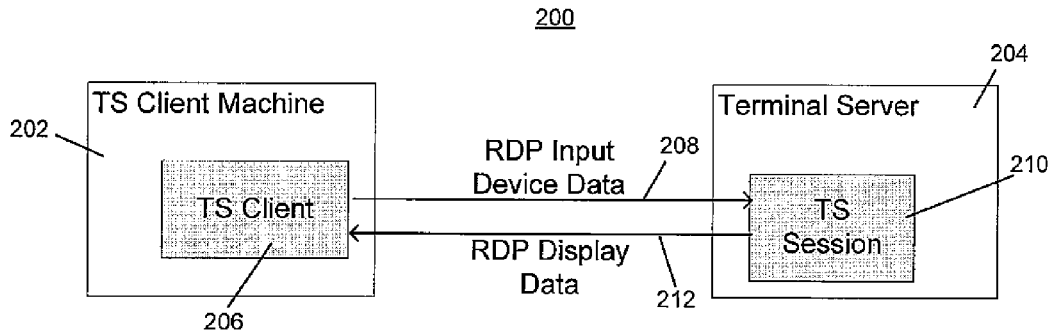
FIG. 2-4 depict an operational environment for practicing aspects of the present disclosure.

FIG. 2 shows an implementation 200 enabling terminal services. A TS client machine 202 and a TS 204 communicate using RDP. The TS client machine 202 runs a TS client process 206 that sends RDP input device data 208, such as for example keyboard data and mouse click data, to a TS session 210 that has been spawned on the TS and receives RDP display data 212, such as user interface graphics data. Generally, the TS client process 206 is a thin client process and most processing is provided on the TS 204.

Figure 3:
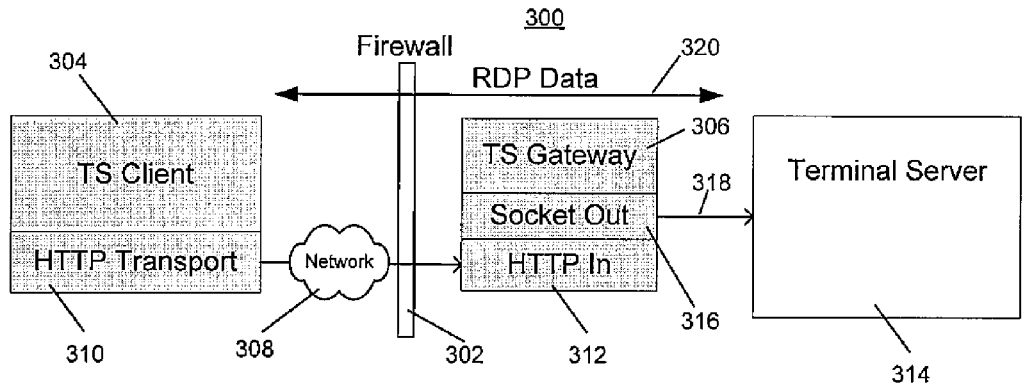

FIG. 3 shows an implementation 300 enabling terminal services through a firewall 302. A remote TS client 304 connects to a terminal services gateway (TSG) 306 over a network 308. A Hypertext Transfer Protocol (HTTP) transport process 310 on the TS client and an HTTP process 312 on the TSG 306 facilitate communication through the firewall 302. The HTTP transport process 310 wraps data, such as Remote Procedure Call (RPC) data or RDP data, in HTTPS headers for the TSG 306. The TSG 306 may connect to the TS 314 over a socket connection 318 via a socket out process 316. Once the TS client 304 is authenticated and a connection is established, RDP data 320 may be passed back and forth between the TS client 304 and the TS 314.

Figure 4:
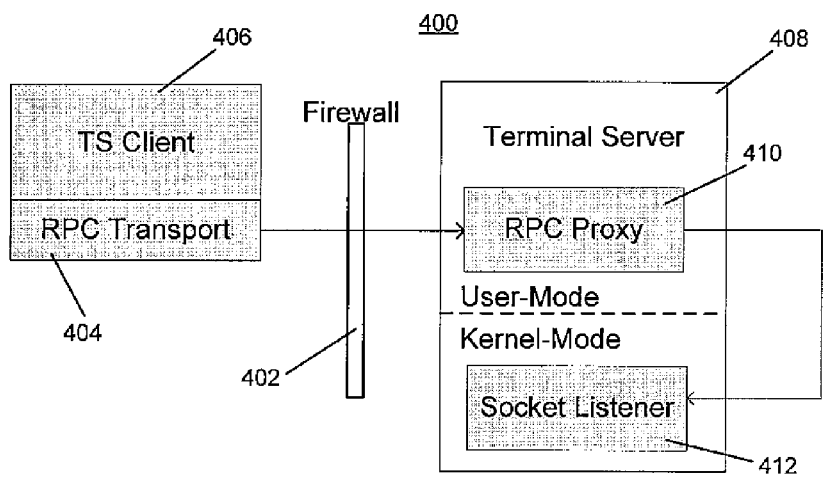

FIG. 4 shows a generalized example of an implementation 400, wherein an existing remote procedure call/hypertext transport protocol (RPC/HTTP) proxy is leveraged, thereby providing a terminal services protocol, such as RDP, over an RPC/HTTP connection through a firewall 402. The architecture of the implementation illustrates that by wrapping the RDP protocol within RPC calls, an existing RPC-based proxy can be advantageously utilized. In particular, an RPC Transport Plug-In 404 on the TS client 406 wraps an RDP stream providing communication between the TS client 406 and the terminal server 408 within an RPC protocol. This facilitates utilization of an RPC-based proxy, thereby enabling firewall navigation. The RPC-based proxy 410, which may run in a user-mode on the TS, can forward received data to a socket listener 412, which may run in kernel-mode on the TS.

As discussed above, clients may use a remote protocol such as Remote Desktop Protocol (RDP) to connect to a resource using terminal services. When a remote desktop client connects to a terminal server via a terminal server gateway, the gateway may open a socket connection with the terminal server and redirect client traffic on the RDP port or a port dedicated to remote access services. The gateway may also perform certain gateway specific exchanges with the client using a terminal server gateway protocol transmitted over HTTPS.

Figure 1A:
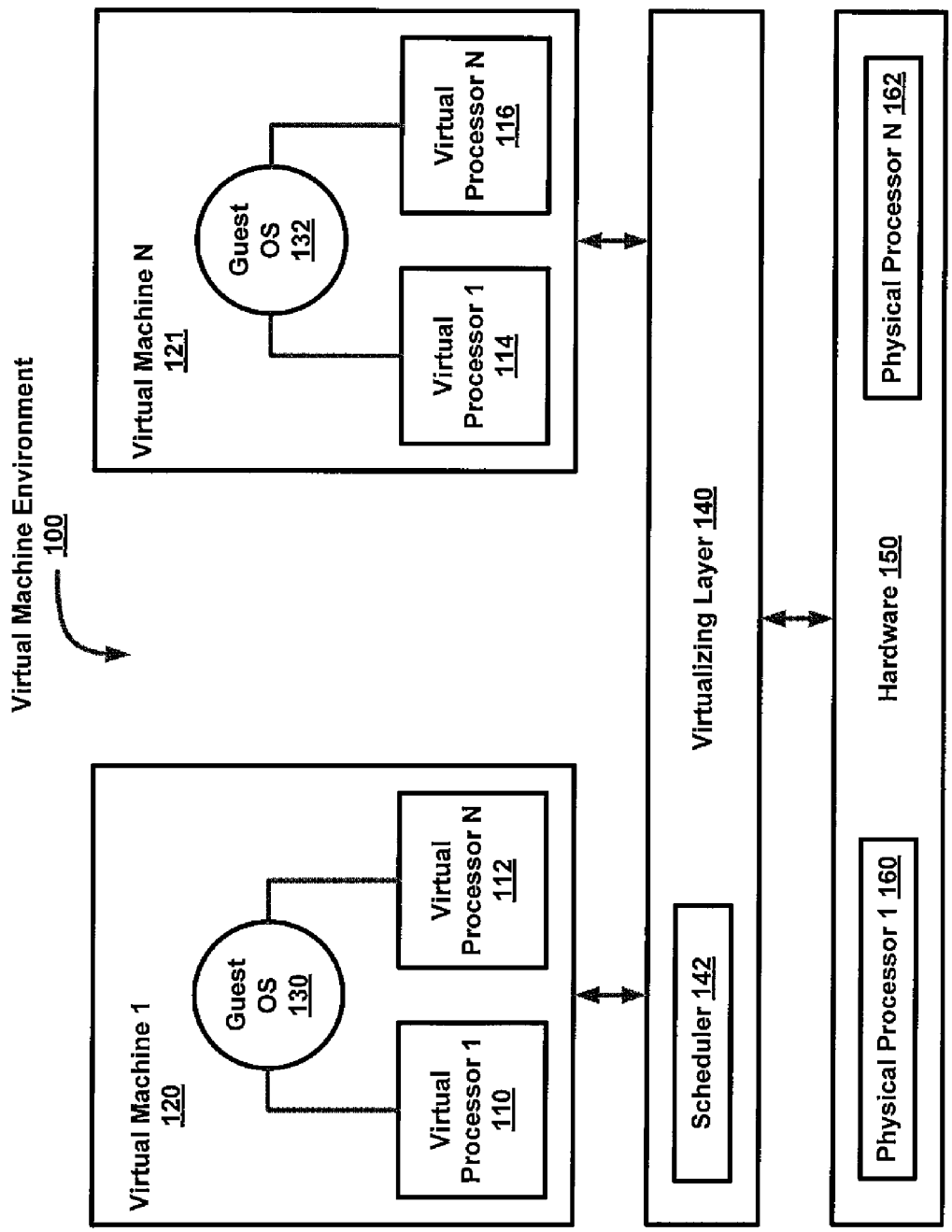
FIG. 1a illustrates a virtual machine environment, with a plurality of virtual machines, comprising a plurality of virtual processors and corresponding guest operating systems; the virtual machines are maintained by a virtualizing layer which may comprise a scheduler and other components, where the virtualizing layer virtualizes hardware for the plurality of virtual machines.

A virtual machine monitor, such as a hypervisor, is a program that creates virtual machines, each with virtualized hardware resources which may be backed by underlying physical hardware resources. FIG. 1a illustrates a virtual machine environment 100, with a plurality of virtual machines 120, 121, comprising a plurality of virtual processors 110, 112, 114, 116, and corresponding guest operating systems 130, 132. The virtual machines 120, 121 are maintained by a virtualizing layer 140 which may comprise of a scheduler 142 and other components (not shown), where the virtualizing layer 140 virtualizes hardware 150 for the plurality of virtual machines 120, 121. The plurality of virtual processors 110, 112, 114, 116 can be the virtual counterparts of underlying hardware physical processors 160, 162.

All of these variations for implementing the above mentioned partitions are just exemplary implementations, and nothing herein should be interpreted as limiting the disclosure to any particular virtualization aspect.

TSV Virtualization Generally

The present disclosure is directed to a system that provides virtual desktop integration with terminal services. An example of a remote access system is Terminal Services™ systems provided by the Microsoft® Corporation. A Terminal Services™ system is discussed in the examples below; however, it is to be appreciated that the techniques discussed are applicable to other remote access systems such as Virtual Network Computing (VNC), Citrix XenApp, and the like.

A session broker controls the allocation of sessions to users communicating in a remote access system environment. A session broker allocates a session to a user based on session state information stored in the session broker. Session state information may include, for example, session IDs, user names, names of the servers where sessions are residing, the number of active sessions in each server computer, and so on.

In a remote access system environment, a server may receive a user request for a connection. The server may initially accept the connection request and then query the session broker to determine where the user can be redirected. The session broker analyzes the session state information of that particular environment and identifies a server to which the user can be redirected. A suitable server may possess a session previously accessed by the user, but later disconnected, to which the user can be reconnected again. In an implementation, a suitable server may provide a new session to which the user can be connected, provided the user does not possess any other existing sessions. The session broker sends information to the requested server enabling the server to establish a connection with the suitable server. For example, the information may include a machine ID, a session ID, and location of the suitable server. The requested server analyzes the information received and redirects the user to the suitable server. Once the user establishes the connection with the suitable server, the user can access applications present in the suitable server. These applications may be compatible to the session broker logic that was used in identifying the suitable server from the terminal services environment. In one embodiment a client computer is connected via a redirector/broker device to one the virtual desktops running on a server or a terminal server. The client computer examines a redirector token in a remote desktop protocol (RDP) compliant packet. The client computer connects to one of the many virtual desktops based on information contained in the redirector token. Use of the redirector token enables integration of the session hosted with one or more VMs (or terminal servers) with the existing terminal session deployment model. The client computer, using the token, can be appropriately directed to either a virtual desktop or terminal session.

In another embodiment, an RDP client computer is connected to one of the virtual desktops using a session broker and a pool manager. The session broker assigns the virtual desktops to the client computer when the client computers connected to a virtual desktop hosted on a VM, and the pool manager indicates which of the virtual desktops are available to be assigned. The session broker can be abstracted from code that creates and manages VM images on-the-fly. This abstraction can be achieved by extensibility points within the broker. Thus the virtual desktop hibernation and state transition may occur and be transparent to the RDP client.

In a further embodiment, the RDP client computer is connected to a virtual desktop. The RDP client computer indicates a network name that is used by the broker to generate an internet protocol (IP) address to establish connection between the client computer and the virtual desktops. By hiding the individual virtual desktop IP addresses from the RDP clients, only a single network name of the broker is initially required to be externally exposed to the terminal server clients. The construction of the virtual desktop and terminal services integration system and an environment in which this integration system may be enabled by techniques is set forth first below with reference to the figures.

Figure 5:
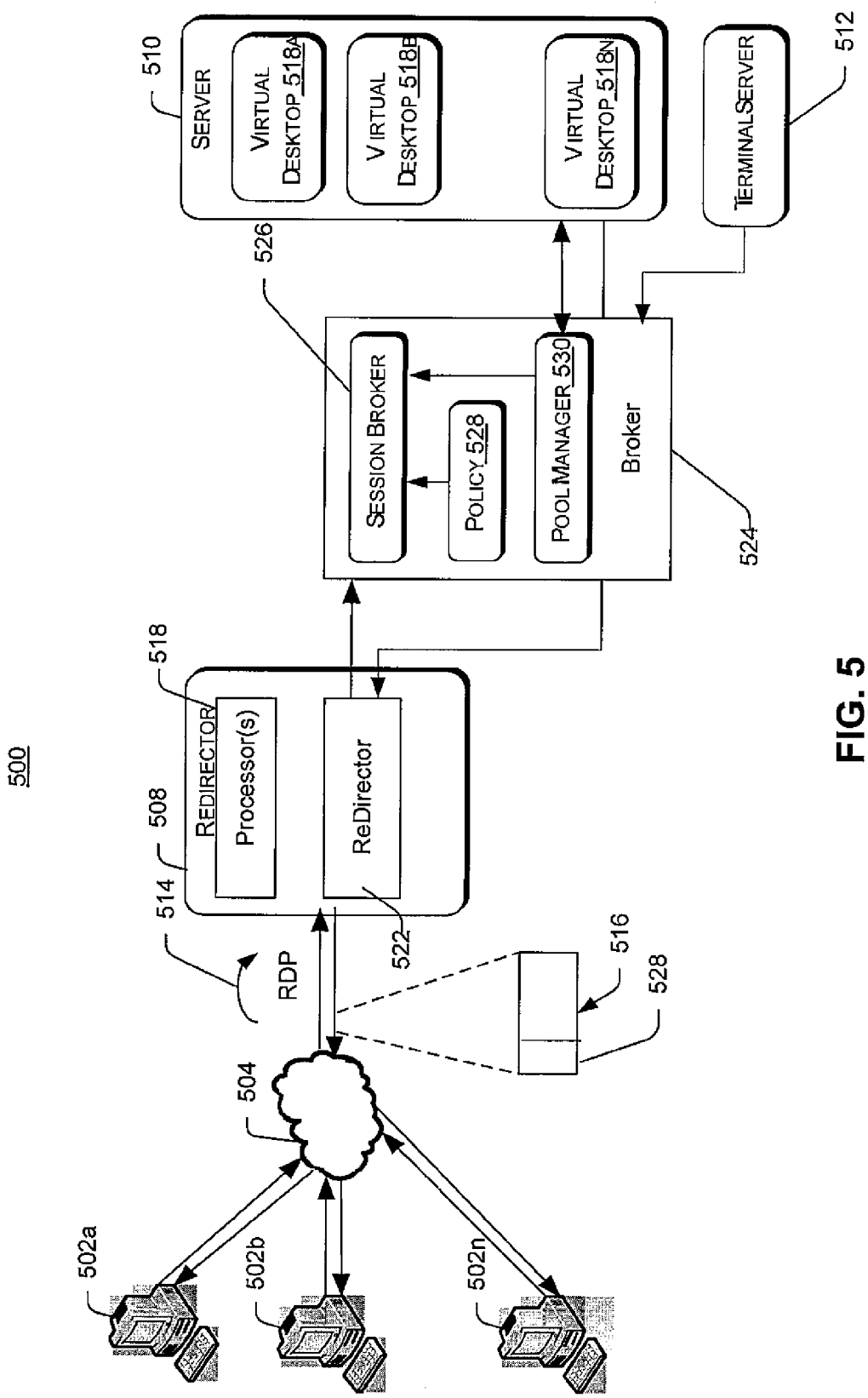
FIG. 5 illustrates an example system in which virtual desktops may be integrated with a terminal server for connecting with client devices.

FIG. 5 illustrates an example system 500 in which there is shown plurality of client devices 502(*a-n*) connected via network 504, redirector device 508 and broker 524 to virtual desktop server 510 and terminal server 552. In one embodiment, the redirector device 508 and the broker 524 are disposed on the same server. In another embodiment, a gateway (not shown) may be connected between redirector device 508 and network 504 or client devices 502(*a-n*).

Client devices 502(*a-n*) may be any computing device capable of communicating with a network 504, and are also referred to as terminal services clients. In one embodiment, the client devices 502(*a-n*) are general purpose desktop computing devices assigned to users (e.g., employees) that are connected to the wired network 504. Although the illustrated client devices 502(*a-n*) are depicted as a desktop PC, the client devices may be implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth. In one embodiment, client devices 502(*a-n*) transmit requests for content, send content and receive content using an RDP protocol 514. Client devices 502(*a-n*) receive content in an RDP packet 516 format from redirector device 508.

Network 504 may be any type of communications network, such as a local area network, wide area network, cable network, the internet, the World Wide Web or a corporate enterprise network. Content is transmitted from and received by client devices 502(a-n) in a packetized format via network 504 for delivery to and from redirector device 508.

Redirector device 508 includes a processor 518. Included in memory (not shown) may be a redirector module 522. Broker module 524 includes a session broker module 526, a policy module 528 and a pool manager module 530. Broker module 524 may be disposed in a server, such as server 510, may be disposed in a standalone server or may be disposed within redirector device 508.

Server 510 includes a plurality of virtual desktops 518(a-n), generally known as virtual machines. Although the illustrated virtual desktops 518(a-n) are shown as a blade within 510 server, the virtual desktops 518(a-n) may be individually implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth. Redirector 522 receives RDP packets from clients 502(a-n) and incorporates those packets for delivery to broker module 524. Redirector 522 also transmits requests from broker module 524 to establish a connection between one of virtual desktops 518(a-n) and client devices 502(a-n). Such requests are received in broker 524 by session broker 526. Broker 524 also receives from server 550 an indication of which virtual desktops 518(a-n) are available.

Session broker 526 also receives a policy indication from policy module 528 indicating criteria for selection of virtual desktops 518(a-n). Session broker 526 then provides an indication to redirector 522 indicating which one of the virtual desktops 518(a-n) are available for connection to one of the client devices 502(a-n). In one embodiment, session broker 526 may indicate that one of client devices 502(a-n) may connect to terminal server 512. The redirector 522 feeds a packet 516 to one of client devices 502(a-n) containing a redirection token 528, indicating an IP address of the virtual desktop. Also the redirector 522 sends an indication of connection to one of client devices 502(a-n), but, in one embodiment, does not expose the IP address of the virtual desktop that the client device is connected. In this embodiment, the re-director maintains a list of the names of the virtual desktops indicated by each of the client devices 502(a-n) and the corresponding IP address of the virtual desktop 518. Thus when a connection name is provided with the request, the re-director 522 establishes a connection between one of the client devices 502(a-n) with the corresponding virtual desktop 518. In another embodiment, redirector 508 may supply the IP address of the virtual desktop to the client device 502 so that client device 502 may directly connect to the virtual desktop.

Figure 6:
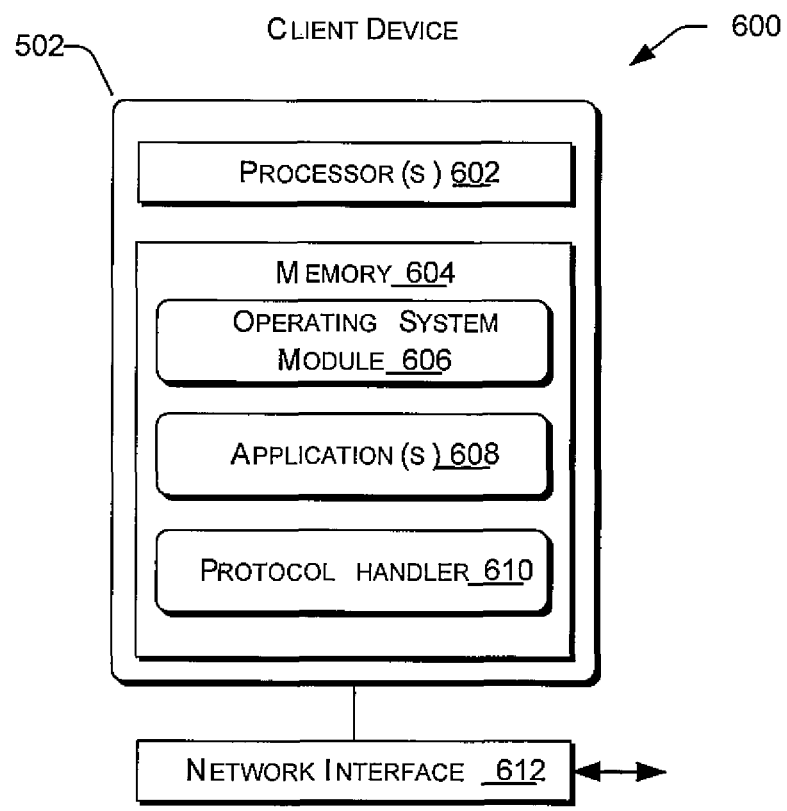
FIG. 6 illustrates a block diagram depicting selected modules in a client computer.

FIG. 6 depicts a block diagram 600 illustrating selected modules in one of client devices 502(a-n) (herein referred to as client device 502) of the integration system 500.

The client device 502 has process capabilities and memory suitable to store and execute computer-executable instructions. In this example, client device 502 includes one or more processors 602, memory 604 and is coupled with network interface 512. The memory 604 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 604 are operating system module 606, application(s) 608, and RDP protocol handler module 512. The modules may be implemented as software or computer-executable instructions that are executed by the one or more processors 602.

The operating system module 606 contains an operating system that may enable the other modules of the client device 502 to receive, process, and exchange data. In addition, the operating system module 606 may also enable the client device 502 to communicate with other devices across a network 504 using network interface 512.

Figure 7:
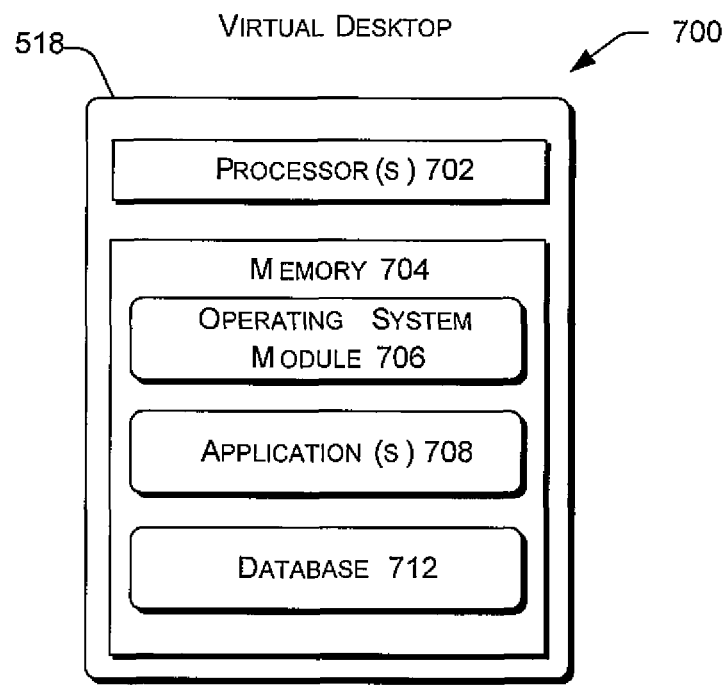
FIG. 7 illustrates a block diagram depicting selected modules in a virtual desktop.

FIG. 7 depicts a block diagram 700 illustrating selected modules in one of virtual desktops 518(a-n) (herein referred to as virtual desktop 518) of the integration system 500. Virtual desktop 518 may be embedded in a server, for example as a blade, or in one embodiment may be set-up as a process in a server having one or more processors.

The virtual desktop 518 has process capabilities and memory suitable to store and execute computer-executable instructions. In this example, virtual desktop 518 includes one or more processors 702 and memory 704. The memory 704 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 704 are operating system module 706, one or more application(s) 708, and database 712. The modules may be implemented as software or computer-executable instructions that are executed by the one or more processors 702.

The operating system module 706 contains an operating system that may enable the other modules of the virtual desktop 518 to receive, process, and exchange data. In addition, the operating system module 706 may also enable the virtual desktop 702 to communicate with other devices via redirector device 508.

Figure 8:
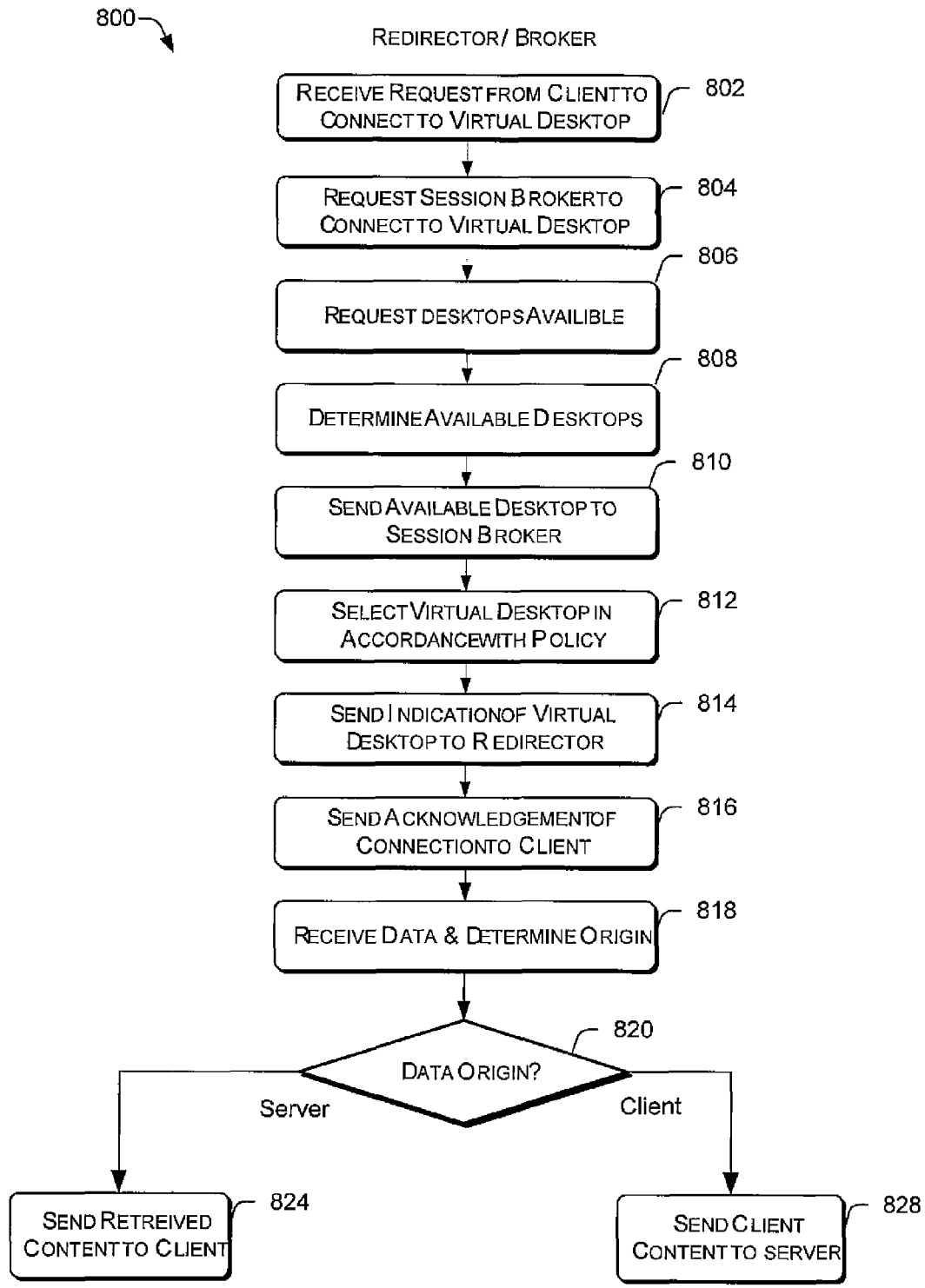
FIG. 8 illustrates a flow diagram of an exemplary process operating on a redirector/broker device for connecting and transferring content between a client device and the virtual desktop.
Figure 9:
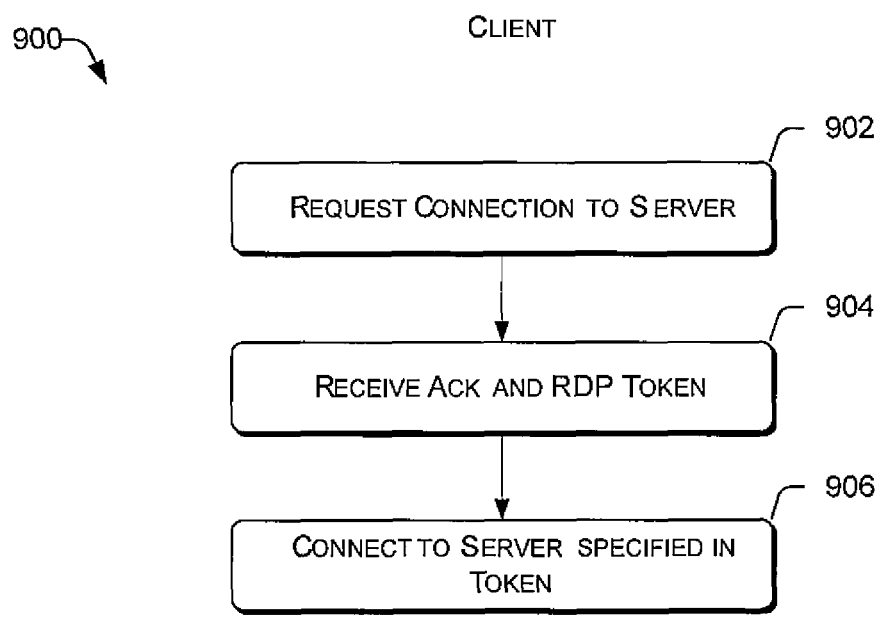
FIG. 9 illustrates a flow diagram of an exemplary process executed with a client device for connecting and transferring content between the client device and the virtual desktop.
Figure 10:
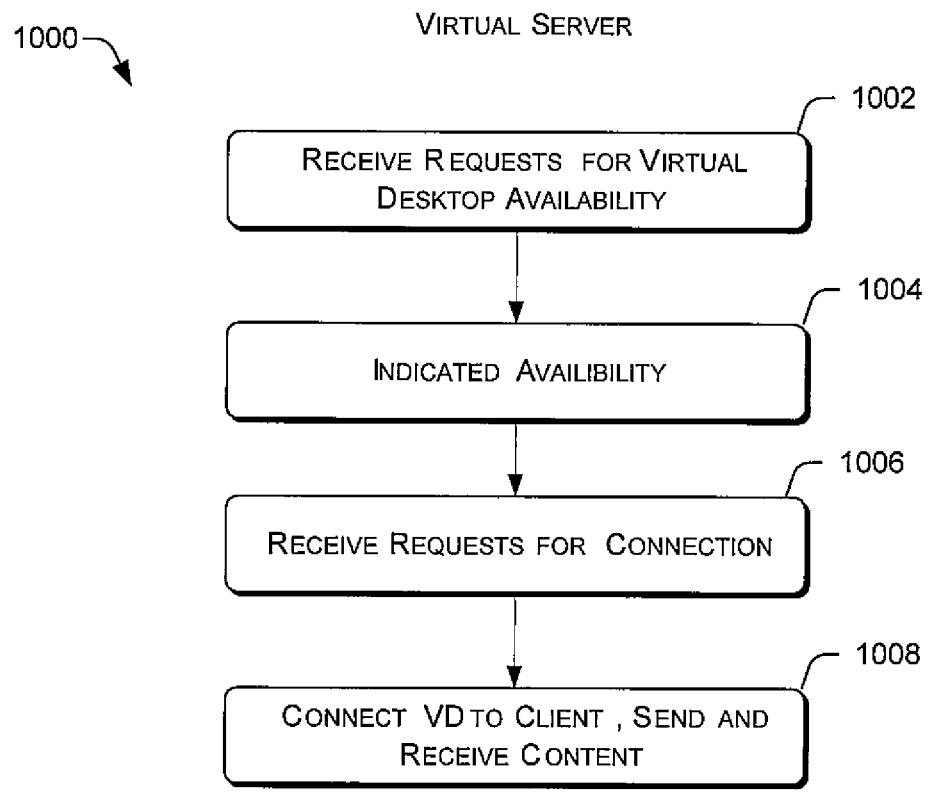
FIG. 10 illustrates a flow diagram of an exemplary process executed with a server device for connecting and transferring content between the client device and the virtual desktop.

The flow diagram in FIG. 8 depicts exemplary processes 802-828 used by processor 518 (see FIG. 5) in redirector device 508 and broker 124 (see FIG. 5), and represents a sequence of operations that can be implemented in hardware, software, and a combination thereof. The flow diagram in FIG. 9 depicts exemplary processes 502-506 used by processor 602 (see FIG. 6) in client device 502 (see FIGS. 5 and 6), and also represents a sequence of operations that can be implemented in hardware, software, and a combination thereof. The flow diagram in FIG. 10 depicts exemplary processes 602-608 used by processor (not shown) in server 510 (see FIG. 5), and additionally represents a sequence of operations that can be implemented in hardware, software, and a combination thereof. In the context of software, the blocks represent computer-executable instructions that, when executed by one or more processors, perform the recited operations.

Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to system 500 of FIG. 5 and system 600 of FIG. 6, although it may be implemented in other system architectures.

FIG. 8 illustrates a flow diagram of an exemplary process 800 used by a redirector device 508 and broker 524 to connect client device 502 with a virtual desktop 518 or terminal server 552. At block 802, a request is received from the client device 502 to connect to one of the virtual desktop 518(*a-n*). The request may include the name of the requesting client device and a name of the virtual desktop. Such a request is received by the redirector 522 and is sent to session broker 526 in block 804. In block 806, the session broker transmits a request to pool manager 530 requesting available virtual desktops. In block 808, the pool manager 530 determines which virtual desktops 518(*a-n*) are available, by polling the virtual desktops or by reading a table stored in memory that tracks the virtual desktop availability. In one embodiment, the pool manager 530 may determine that the terminal server 552 is available for transmitting and receiving content. In block 810 pool manager 530 provides a notification of virtual desktop availability to session broker 526.

In block 852, the session broker 526 reads a table in policy module 528 indicating which of the virtual desktops 518(*a-n*) may be used with a particular client device 502. Such elements of the table may be set by an administrator. In accordance with the table, the virtual desktop 518 is selected and the IP address for the virtual desktop 518 is provided to redirector 522 in block 814. Redirector 522 then stores the IP address and the corresponding name provided by the client device 502. In block 816, a connection is established by feeding an acknowledgment of the connection request to client device 502.

Once the connection is established, in block 818 the redirector device 508 then receives content during a session from either one of the virtual desktops 518(*a-n*) or one of the client devices 502(*a-n*). In block 820, the origin of the content is determined. If the content originates from one of the virtual desktops 518(*a-n*) in server 510, in block 824 the redirector 522 feeds retrieved content to the client device 502 If the content originates from one of the client devices 502(*an*), in block 826 the redirector 122 reads the address for the device originating the content, and feeds the client content using redirector device 508 to the corresponding virtual desktop 518 (or terminal server 512) in block 828.

FIG. 9 illustrates a flow diagram of an exemplary process 900 used by client device 502 to connect via redirector device 508 with a virtual desktop 518 or terminal server 512. At block 902, a request is made by the client device 502 to connect to one of the virtual desktops 518(*a-n*). In one embodiment, the request may be made by the device 502 to connect with the terminal server 512. In block 904, the client device 502 may receive and acknowledgment that it is connected to the virtual desktop. Once it is connected, client device 502 may start a session by transmitting or receiving data from the virtual desktop 518. In one embodiment, a token may be received from the redirector device 508 in the RDP packet indicating an IP address, or a name of the virtual desktop that the client device 502 is connected. In block 906, the client device may indicate that name or address to redirector device 508 when connecting the virtual desktop 518. In another example, the name or address may correspond to an IP address of terminal server 512.

FIG. 10 illustrates a flow diagram of an exemplary process 1000 used by server 510, e.g. a VM host, to initiate a connection to client device 502 via redirector device 508. At block 1002, the server 510 receives requests for virtual desktop 518 availability. In block 1004, the server 510 polls its virtual desktops, and feeds an availability indication to server 508. In block 1006, the server 510 receives requests for connection between one of the virtual desktops 518 and one of the client devices. The request may include the IP address of the requested virtual desktop. In block 1008, server 510 indicates that a connection has been established. Further, server 510 both sends content to and receives content from the client device 502.

API for Terminal Services Virtualization

Further described in the present disclosure are techniques for a remote access system session broker infrastructure that may support third party plug-in applications. A challenge that the remote access system environment faces is to provide users access to third party applications, and in particular plug-in applications. The techniques described herein addresses this challenge by providing an application program interface (API) that leverages the remote access system session broker infrastructure to support third party plug-in applications. In a typical scenario, when a user requests for a connection to access third party plug-in applications, the API may override the session broker logic and interact with the session broker process to identify sessions or suitable servers to which the user can be connected. The user may access the third party plug-in applications through the identified sessions or suitable servers.

In one embodiment, the third party plug-in applications may be updated from changes made in the remote access system environment, for example, creation of new sessions, deletion of sessions, configuration changes in servers, connection and disconnection information of sessions, etc. The session broker process may manage the changes in the remote access system environment, and notify the changes to the third party plug-in applications upon receiving instructions from the API.

The techniques described herein may be used in many different operating environments and systems. Multiple and varied implementations are described below. An exemplary environment that is suitable for practicing various implementations is discussed in the following section.

Exemplary systems and methodologies for leveraging a remote access system session broker infrastructure to support third party plug-in applications are described in a general context of computer-executable instructions (program modules) being executed by a computing device, such as a personal computer. Program modules generally include routines, programs, objects, components, data structures, etc., that perform particular tasks or implement particular abstract data types. While the systems and methods are described in the foregoing contexts, acts and operations described hereinafter is implemented in hardware or other forms of computing platforms.

Figure 11:
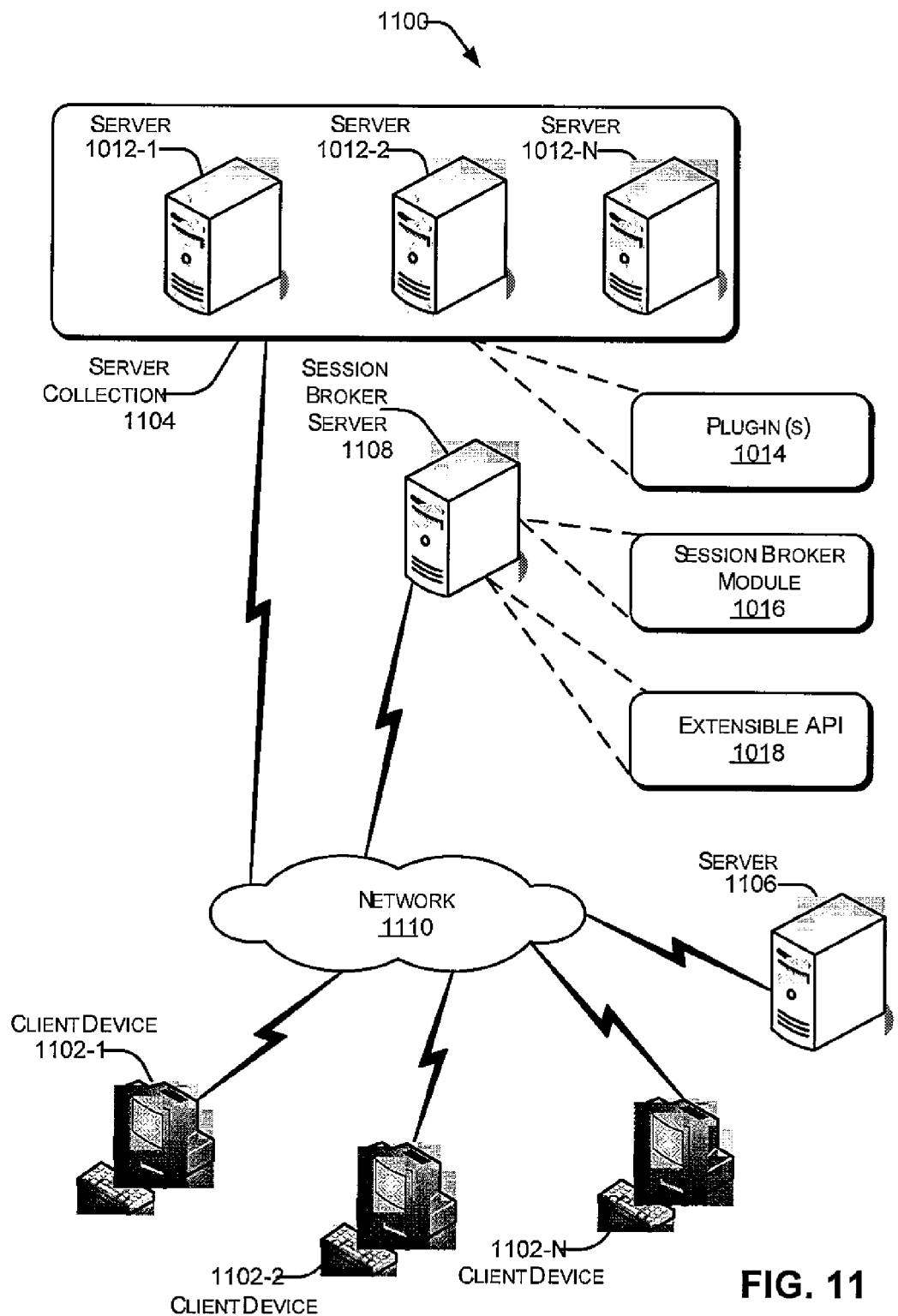
FIG. 11 illustrates a block diagram illustrating an exemplary network architecture for leveraging a remote access system session broker infrastructure to support third party plug-in applications.

FIG. 11 shows an exemplary network architecture 1100 for leveraging a remote access system session broker infrastructure to support third party plug-in applications. To this end, a network architecture 1100 is described that includes a number of client devices 1102-1, 1102-2, . . . , 1102-N (collectively referred to as client devices 1104) that may communicate with a server collection 1104, an external server or server 106, and a session broker server 1108 through a network 110. In one implementation, the server collection 1104, the server 106, and the session broker server 1108 may interact with numerous personal computers (PCs), web servers, and other computing devices spread throughout the world in the network architecture 1100. Alternatively, in another possible implementation, the network architecture 1100 can include a limited number of PCs communicating with a single server through a local area network (LAN) or a wide area network (WAN), and the like.

The network 1110 may be a local area network (LAN), a wide area network, a wireless network, an optical network, a metropolitan area network (MAN), etc. The client devices 1102 may be a general-purpose computing device, a laptop, a mobile computing device, and so on.

The server collection 1104 may include a number of servers 1112-1, 1112-2, . . . , 1112-N (collectively referred to as servers 1112). The servers 1112 may have plug-in(s) 1114 available for the client devices 1102. The plug-in (s) 1114 may include, for example, third party plug-in applications, and any other software applications. As discussed above, sessions created between the servers 1112 and the client devices 1102 enable the client devices 1102 to access the plug-in(s) 1114 hosted in the servers 1112. The servers 1112 create these sessions based on instructions received from the session broker server 1108.

In one embodiment, a client device 1102-1 may send a request to the server collection 1104 to access the plug-in(s) 1114 hosted there. A server 1112-1 from the server collection 1104 accepts the request and establishes a connection with the client device 1102-1. The server 1112-1 may send a query to the session broker server 1108 to determine where to redirect the client device 1102-1. It is to be noted that any server 1112 from the server collection 1104 may accept the connection request from the client device 1102-1. In another implementation, the server 1112-1 may act as a dedicated redirector and accepts the connection request from the client device 1102-1. In such an implementation, the client device 1102-1 requesting for a connection may initially connect to the server 1112-1.

The session broker server 1108 may implement a session broker module 1116 and an extensible API 1118 to process the query sent by the server 1112-1 and identify a session that can be provided to the client device 1102-1. The extensible API 1118 may be a Distributed Component Object Model (DCOM) based interface that enables several software components distributed across server network computing devices to communicate with each other. In one implementation, the extensible API 1118 may be a Component Object Model (COM) based interface that enable communication between various software components in a network environment.

In one embodiment, the session broker module 1116 may receive the query and notify the extensible API 1118 of the receipt of the query. The extensible API 1118 generates a function call that may trigger the session broker module 1116 to identify the session. The identified session may be an existing session that was earlier associated with the client device 1102-1. The session broker module 1116 may then instruct the server 1112-1 to redirect the client device 1102-1 to any one of the servers 1112, for example, the server 1112-2, having an existing session. In this instance, the server 1112-1 redirects the client device 1102-1 to establish a connection with the server 1112-2. In another implementation, the session broker module 1116 may also redirect the client device 1102-1 to the server 1108 having an existing session, located outside the server collection 1104.

In yet another embodiment, the session broker module 1116 may identify any suitable server 1112 having a new session that can be provided to the client device 1102-1, which may not have any existing session in the remote access system environment. The session broker module 1116 then instructs the server 1112-1 to redirect the client device 1102-1 to a suitable server out of the servers 1112. In yet another implementation, the session broker module 1116 may identify the server 1108 as capable of providing the new session to the client device 1102-1.

Figure 12:
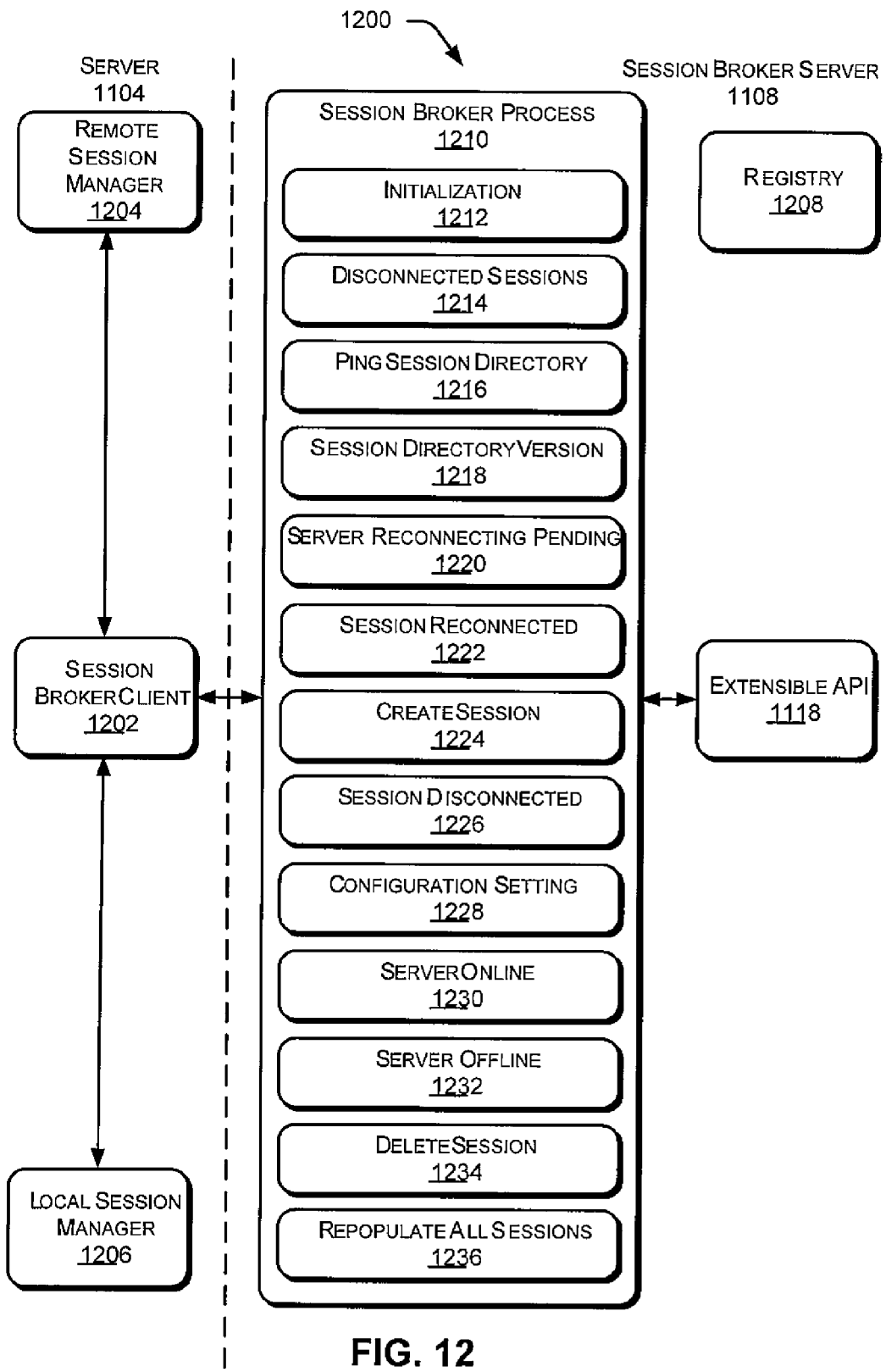
FIG. 12 illustrates a block diagram illustrating an exemplary architecture for leveraging a remote access system session broker infrastructure to support third party plug-in applications.

FIG. 12 shows an exemplary system architecture 1200 for leveraging a remote access system session broker infrastructure to support third party plug-in applications. The system architecture 1200 illustrates interactions between one of the server from the server collection 1106, for example, server 1112-1, and the session broker server 1108. The server 1112-1 may include a session broker client 1202 that interacts with a remote connection manager 1204 and a local session manager 1206. It is to be noted that the servers 1112 in the server collection 1104 may include their respective session broker client, remote connection manager, and local session manager. The session broker server 1108 may further include the session broker module 1116 interacting with a registry 1208 and the extensible API 1118.

The server 1112-1 initially connects with a client device 1102-1 and receives a request from the client device 1102-1 for connection to a session. The session broker client 1202 collects the request along with client information. The client information may include, for example, machine ID and location of the client devices 1102 in the remote access system environment. The session broker client 1202 sends both the request and the client information to the session broker module 1116. The session broker module 1116 may perform various functions shown as a part of a session broker process 1208 to identify a server out of the servers 1112 to which the client device 1102-1 can be redirected.

In operation, the session broker module 1116 may inform the extensible API 1118 about the receipt of the request. In one implementation, the session broker module 1116 may perform a function, namely initialization 1212 to initialize the plug-in(s) 1114. During the process of initialization 1212, the session broker module 1116 determines a class ID of the plug-in(s) 1114 from the registry 1208. The registry 1208 may include, for example, class IDs of various plug-in applications, information about settings of hardware, operating system, nonoperating system, client devices, servers, and so on. Pursuant to identifying the class IDs of the plug-in(s) 1114, the session broker module 1116 may create an instance for the plug-in(s) 1114, which in turn initialize the plug-in(s) 1114. Once an instance is created, the extensible API 1118 may trigger the session broker module 1116 to initiate a function call 'TSSDRpcGetUserDisconnectedSessions', depicted as disconnected session 1214, to identify the session to which the client device 1102-1 can be redirected. In one implementation, disconnected session 1214 may determine an existing session to which the client device 1102-1 was connected previously, but later disconnected. In such a scenario, the session broker module 1116 may make function calls, namely 'TSSDRpcPingSD' and 'TSSDRpcQuerySD-Version', to identify an existing session from the session directory and, at the same time determine the version of the session directory. The above function calls may be shown as ping session directory 1216 and session directory version 1218, respectively. The existing session may be a session associated with any one of the servers 1112 in the server collection 1104. In another implementation, the existing session may be associated to the server 1106 located external to the server collection 1104.

Upon identifying an existing session, the session broker module 1116 may collect session details, for example, session ID, machine ID, and location related to the server that may provide the existing session (e.g., server 1112-1). For example, the session broker module 1116 may then send the session details along with instructions to establish a connection to the remote connection manager 1204. The remote connection manager 1204 identifies the server 1112-2 out of the servers 1112 based on the session details, and redirects the client device 1102-1 to the server 1112-2 to establish a connection. During the process of redirecting the client device 1102-1, the remote connection manager 1204 may send a request for a connection to the server 1112-2.

The session broker module 1116 continuously monitors the status of the connection and updates the extensible API 1118 of any changes that occur in the remote access system environment. During the monitoring process, the session broker module 1116 may make a function call (i.e., 'TSSDRpcSetServerReconnectPending'), shown as server reconnection pending 1220, to inform the extensible API 1118 that a request for connection with the server 1112-2 is pending.

Once the connection is established, the session broker module 1116 may report the connection status to the extensible API 1118. For example, the session broker module 1116 may make a function call 'TSSDRpcSetSessionReconnected', shown as session reconnected 1222, to confirm the extensible API 1118 that the client device 1102-1 is connected.

The extensible API 1118 may initiate the session broker module 1116 to generate another function call (i.e., disconnected session 1214), to identify a new session that can be provided to the client device 1102-1. In such a case, the session broker module 1116 collects server details associated with the server, that may be either from the server collection 1104 for example, server 1112-2 or the external server 1106, and sends the server details to the remote connection manager 1204. The remote connection manager 1204 directs the client device 1102-1 to create a new session with the server 1112-2 or the server 1106. In an implementation, the session broker module 1116 confirms whether a new session is created and accordingly initiates a function call, namely 'TSSDRpcCreateSession' depicted as create session 1224, to inform the plug-in(s) 1114 about the creation of the new session.

In the above implementations, the extensible API 1118 may randomly but continuously initiate the session broker module 1116 to make a function call (i.e., 'TSSDRpcSetSessionDisconnected'), depicted as session disconnected 1226, to inform the plug-in(s) 1114 that the session connecting the client device 1102-1 and the server 1112-2 or the server 1106 is disconnected. In such a situation, the session broker module 1116 may instruct a local session manager to monitor the disconnected session.

In addition to the above, the extensible API 1118 may trigger the session broker module 1116 to provide information regarding configuration changes made in the remote access system environment. In such a scenario, the session broker module 1116 may initiate a function call (i.e., 'TSSDRpcUpdateConfigurationSetting') shown as configuration setting 1228, that may collect information related to configuration changes and reports the changes, if any, to the plug-ins 1114.

The extensible API 1118 may instruct the session broker module 1116 to identify the status of the server 1112-2 or server 1108 connected to the client device 1102-1. The session broker module 1116, after receiving instructions, may make function calls, namely 'TSSDRpcServerOnlineEx', and 'TSSDRpcServerOffline', respectively shown as server online 1230 and server offline 1232, to inform the plug-in 1114 whether the server 1112-2 or server 1108 is offline.

The extensible API 1118 may interact with the session broker module 1118 to determine the status of various sessions running at a specific time in the remote access system environment. In such an implementation, the session broker module 1118 may initiate a function call, for example 'TSSDRpcDeleteSession', shown as delete session 1234 to inform the plug-in(s) 1114 that the session is deleted. The session broker module 1118 may initiate a function call, namely 'TSSDRpcRepopulateAllSession' shown as repopulate all sessions 1236, to check status of all the sessions managed by the session broker module 1118.

Figure 13:
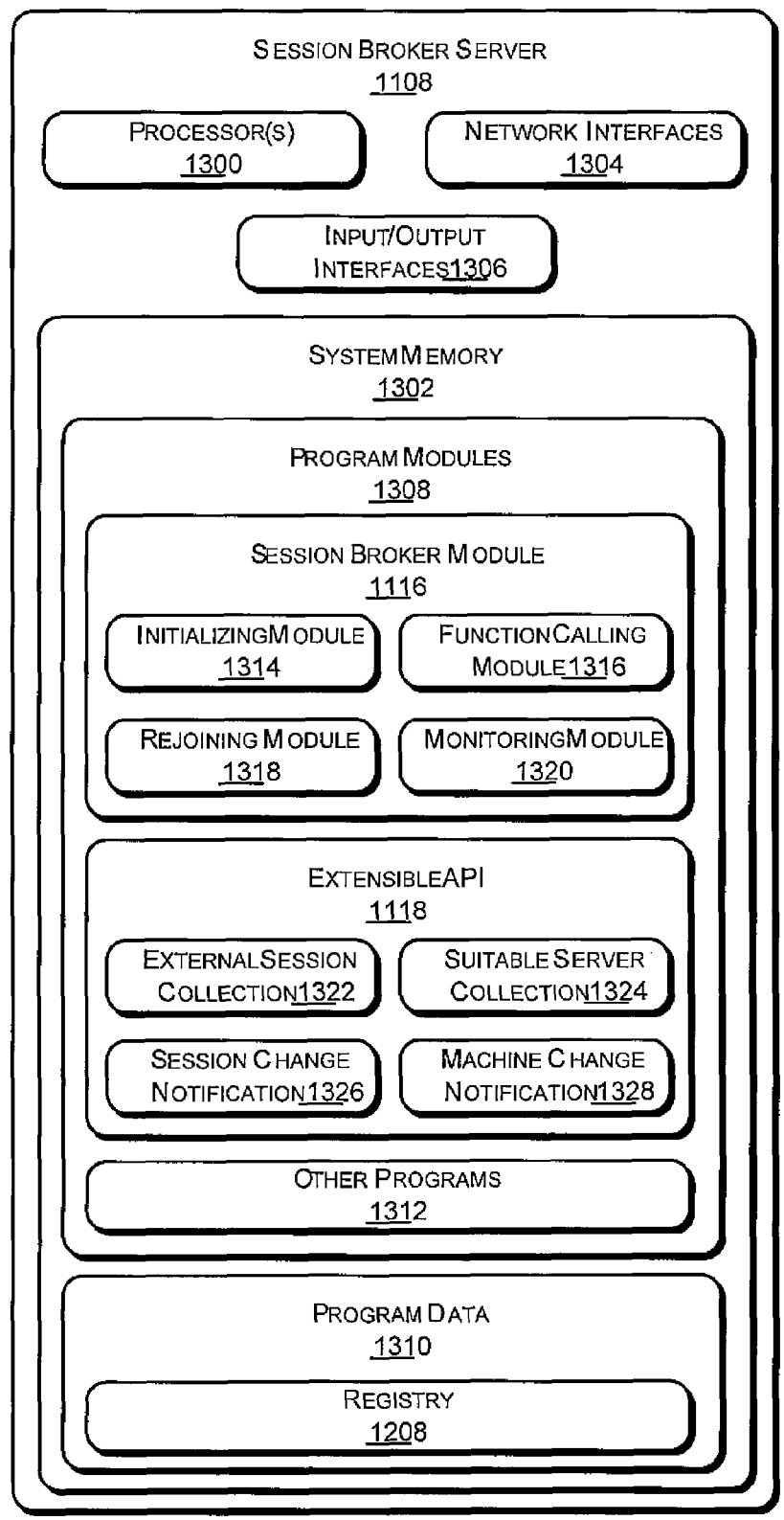
FIG. 13 illustrates a block diagram illustrating an exemplary server system for leveraging a remote access system session broker infrastructure to support third party plug-in applications.

FIG. 13 describes certain functional aspects of session broker server 1108 associated with leveraging a remote access system session broker infrastructure to support third party plug-in applications in detail. The server 1108 includes processor(s) 1300 and a system memory 1302. The server 1108 further includes network interfaces 1304 to provide connectivity to a wide variety of networks, such as the network 1102 described in the FIG. 11, and protocol types such as wired (e.g., LAN, cable, etc.) and wireless networks (e.g., WLAN, cellular, satellite, etc.). Input/output interfaces 1306 provide data input and output capabilities for the server 1108. The input/output interfaces 1306 may include, for example, a mouse port, a keyboard port, etc.

The system memory 1302 stores program modules 1308 and program data 1310. The program modules 1308 may include the session broker module 1116, an extensible API 1118, and other application program modules 1312 (e.g., an Operating System (OS) to provide a runtime environment, networked communications between multiple users).

The session broker module 1116 has several responsibilities including acting as a central unit to the remote access system environment, allocating sessions to the client devices 1102 requesting for connection, and monitoring the sessions in the remote access system environment. The session broker module 1116 may include an initializing module 1314, a function calling module 1316, a monitoring module 1318, and a rejoining module 1320.

As discussed above, the session broker module 1116 may be employed to receive a request for a session sent by the client device 1102-1 through the server 1112-1. Based on the request received, the initializing module 1314 initializes the extensible API 1118. The initializing module 1314 may determine a class ID of the plug-in(s) 1114 from the registry 1208. Once the class ID of the plug-in(s) 1114 matches with the class ID as stored in the registry, the initializing module 1314 may create an instance to initialize the extensible API 1118.

The extensible API 1118 instructs the session broker module 1116 to generate appropriate function calls as discussed previously to identify the session to which the client device 1102-1 can be redirected. Therefore, a function call, for example 'WTSSBX_GetUserExternalSession' shown as external session collection 1322, is called to identify external sessions present in the remote access system environment. The external session may be sessions provided by the server 1106 located outside the server collection 1104. In such a case, the external session collection 1322 may trigger the function calling module 1316 to generate a function call such as disconnected session 1214 to determine whether the server 1106 can offer an external session to the client device 1102-1 and also collect the session details if connected externally. Thereafter, the session broker module 1116 may collect the session details and direct the client device 1102-1 to the server 1106 through the server 1112-1. The function call made by the function calling module 1316 may be monitored by the monitoring module 1318 to determine whether the function call is pending beyond a predefined time. The predefined time may be preset by a user, such as an administrator. In case the function call remains pending beyond the predefined time, the monitoring module 1318 may instruct the session broker module 1116 to log an error message, if the plug-in(s) 1114 fails. Thereafter, the session broker module 1116 may initiate the extensible API 1118 again.

In one embodiment, the external session collection 1322 may trigger the function calling module 1316 to generate a function call to determine an existing session associated with the client device 1104 from the remote access system environment. The function calling module 1316, in turn generates function calls, such as ping session directory 1216 and session directory version 218, to identify an existing session of the client device 1102-1 from the session directory. The function calling module 1316 may identify any one of the servers 1112 in the server collection 1104, for example server 1112-2 capable of providing an existing session. In such a scenario, the function calling module 1316 collects server details of the server 1112-2 and provides their server details to the session broker module 1116. Based on the server details, the session broker module 1116 may direct the client device 1102-1 to the server 1112. In another implementation, the existing session may be provided by the server 1106 located external to the server collection 1104.

The extensible API 1114 may initiate the function calling module 1316 to make a function call, namely suitable server collection 324 to identify a suitable server from the server collection 1104 or external server 1106, that can provide a new session to the client device 1102-1. For example, the function calling module 1316 may make a function call namely, 'WTSSBX_GetMostSuitableServer' to identify the suitable server that can provide a new session to the client device 1102-1. Therefore, the function calling module 1316 collects server details associated with a suitable server that looks suitable for connection and enables the session broker module 1116 to instruct the server 1112-1 to establish a connection between the client device 1104 and the suitable server.

The function call as discussed above may be monitored by the monitoring module 1318 to determine whether the function call is pending beyond a predefined time. In case the function call remains pending beyond the predefined time, the monitoring module 1318 may instruct the session broker module 1116 to log an error message, if the plug-in(s) 1114 fails. Thereafter, the monitoring module 1318 redirects the extensible API 1118 to interact with a load balancing algorithm of the session broker module 1116. The load balancing algorithm enables the session broker module 1116 to identify a list of suitable servers. The session broker module 1116 identifies a suitable server having the least number of sessions and instructs the server 1112-1 to redirect the client device 1102-1 to the suitable server.

In the above embodiments, the extensible API 1118 may be configured to make a call session change notification 1326 that triggers the session broker module 1116 to update the plug-in(s) 1114 about changes occurring in the sessions. For example, the extensible API 1118 may make a function call, namely 'WTSSBX_SessionChangeNotification', to enable the session broker module 1116 to collect information about any changes occurring in the sessions, such as creation of new sessions, disconnection of existing sessions, reconnection of sessions, and deletion of sessions.

In one embodiment, when the function call namely, 'WTSSBX_SessionChangeNotification' remains pending more than the predefined time and plug-in(s) 1114 fails, an error event is logged.

In addition, the extensible API 1118 may make a call 'WTSSBX_MachineChangeNotification', shown as machine change notification 1328, to initiate the session broker module 1116 to gather information and then report about changes occurring in the servers 1112 and external server 1106 in the remote access system environment to the plug-in(s) 1114. The changes that occur may include, configuration changes in the servers, and changes in status of the servers (i.e., online or offline status of the servers). In an implementation, when a function call 'WTSSBX_MachineChangeNotification' remains pending for more than a predefined time and the plug-in(s) 1114 fail, an error event is logged.

Exemplary processes for leveraging a remote access system session broker infrastructure to support third party plug-in applications are described with reference to FIGS. 11-13. These processes may be described in the general context of computer executable instructions. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

Figure 14:
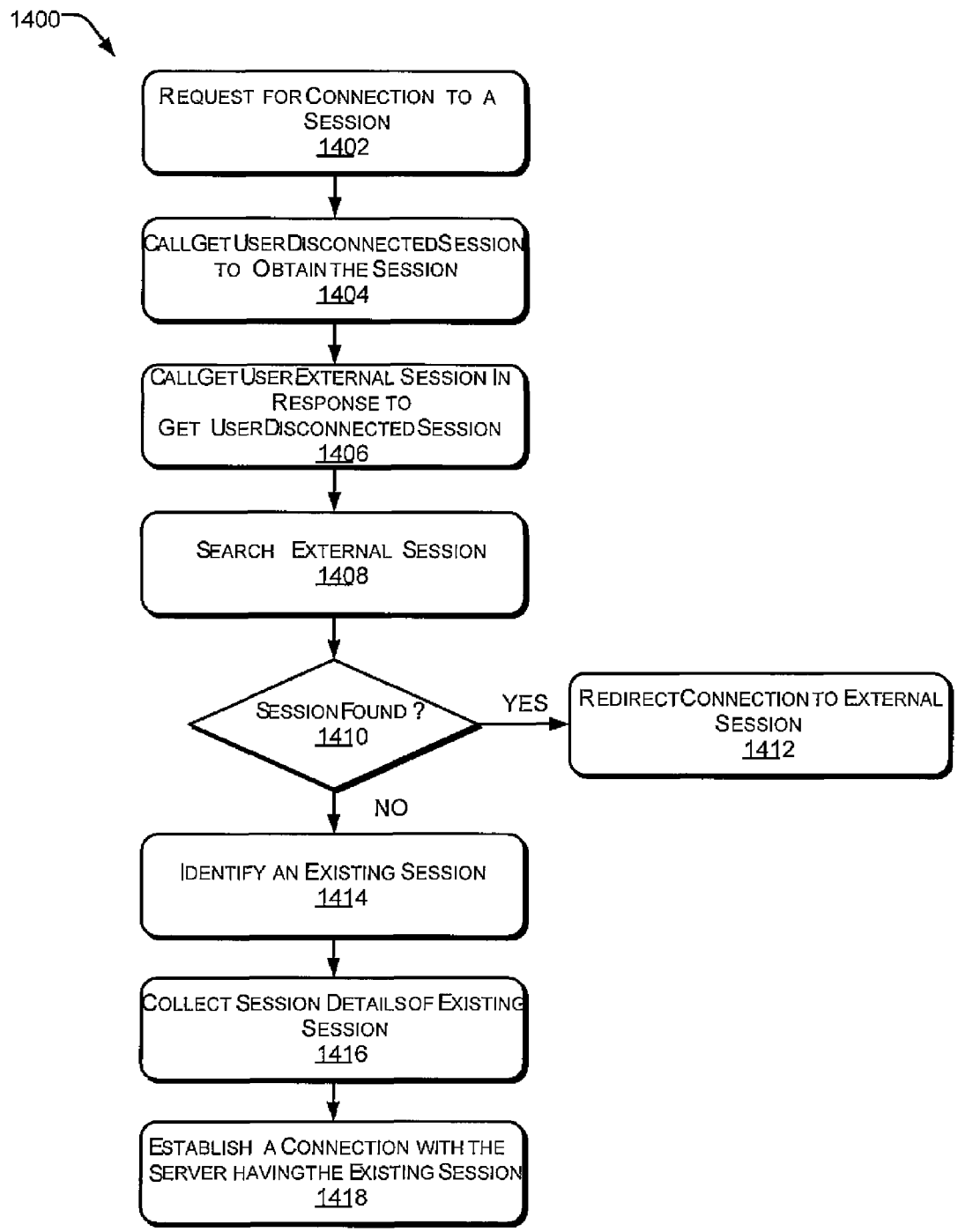
FIG. 14 illustrates a flow chart illustrating an exemplary method for leveraging a remote access system session broker infrastructure to support third party plug-in applications.

FIG. 14 illustrates an exemplary method 1400 for leveraging a remote access system session broker infrastructure to support third party plug-in applications. The process 1400 is illustrated as a collection of blocks in a logical flow graph, which represents a sequence of operations that can be implemented in a hardware, software, or a combination thereof. In the context of software, the blocks represent computer instructions that, when executed by one or more processors, perform the recited operations.

The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method can be implemented in any suitable hardware, software, firmware, or a combination thereof, without departing from the scope of the disclosed subject matter.

At block 1402, a user requests for a connection to a session. In one implementation, user of the client device 1102-1 makes a request to the server 1112-1 for a session in order to access the plug-in(s) 1114 or any other applications hosted on the servers. The session broker module 1116 receives the request for a session from the server 1112-1, that is initially connected with the client device 1102-1. Thereafter, the session broker module 1116 initializes the extensible API 1118 associated with the plug-in(s) 1114.

At block 1404, a function call, i.e., 'GetUserDisconnectedSession', is called to obtain a session. In one implementation, the server 1112-1 acting a redirector for the client device 1102-1 makes the function call to the session broker server 1108. The session broker module 1116 of the session broker server 1108 receives the function call and informs the extensible API of the function call.

At block 1406, a function call, namely 'GetUserExternalSession', is made in response to the call 'GetUserDisconnectedSession'. The session broker module 1116 may send the server function call made by the server 1112-1 to the extensible API 1118. The extensible API 1118, upon receipt of this server function call, may make a function call 'GetUserExternalSession' to identify a session for the client device 1102-1.

At block 1408, an external session for the user of the client device is searched. A function call 'GetUserExternalSession' initiated by the extensible API 1118 may trigger the session broker module 1116 to identify a user external session present in the remote access system environment.

At block 1410, a determination is made whether the external session is present or not. If an external session is present (i.e., the "YES" path from block 1410), the client device 1102-1 is redirected to the server 106 to establish the external session. If there are no external sessions present in the remote access system environment (i.e., the "NO" path from block 1410), an exiting session associated with the client device 1102-1 is identified at block 1414.

At block 1416, after an existing session is identified, session details of that existing session is collected. Such session details may be stored in the session directory stored in the session broker server 1108. At block 1418, a connection with the server having an existing session is established. The session broker module 1116 may send instructions along with the session details of the suitable server having an existing session to the server 1112-1 configured to redirect the client device 1102-1. The server 1112-1 identifies the suitable server based on the session details and redirects the client device 1102-1 to the suitable server to establish a connection.

Figure 15:
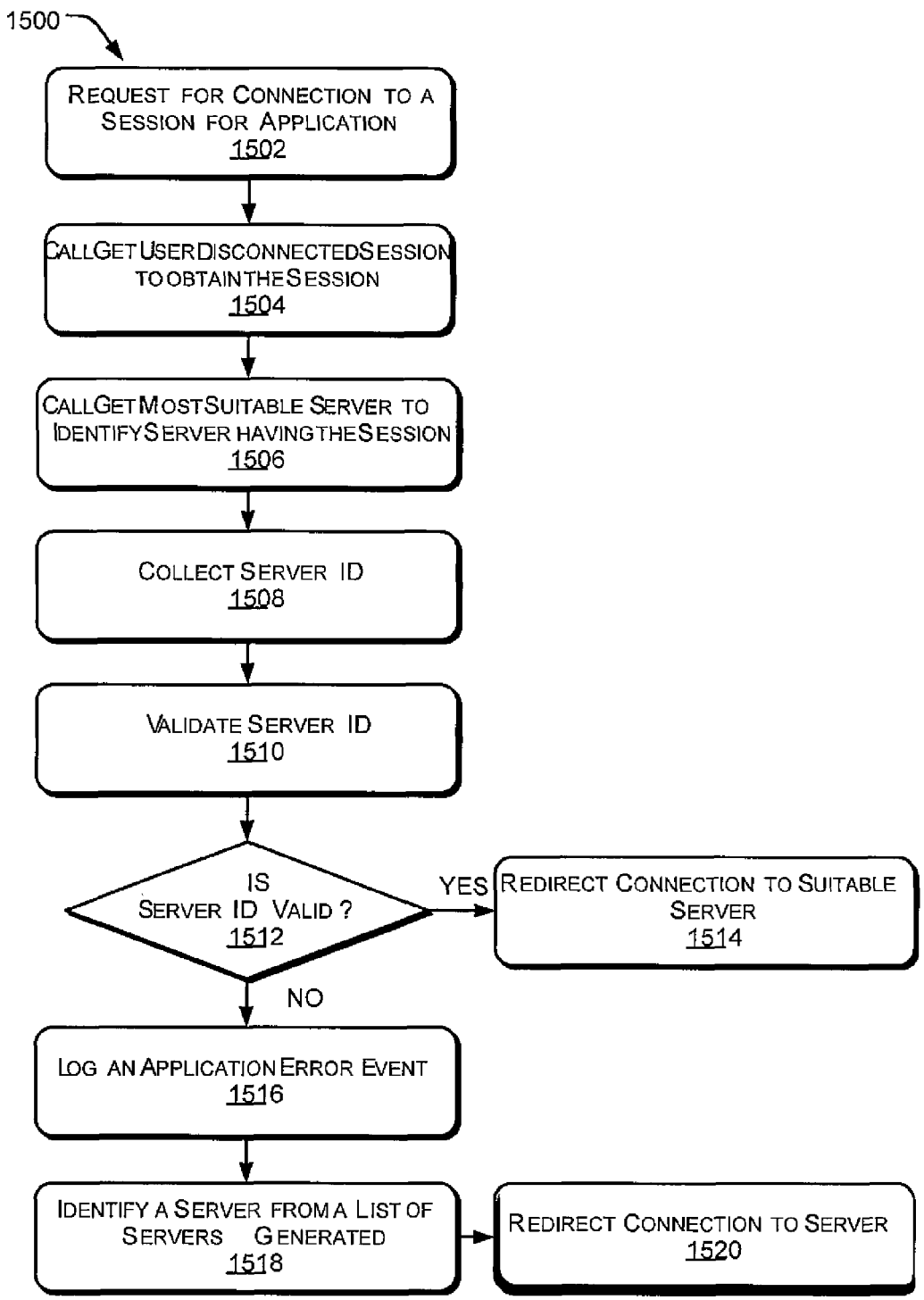
FIG. 15 illustrates a flow chart illustrating another exemplary method for leveraging a remote access system session broker infrastructure to support third party plug-in applications.

FIG. 15 illustrates another exemplary method 1500 for leveraging a remote access system session broker infrastructure to support third party plug-in applications. At block 1502, a request for a connection to a session is made. The session broker module 1116 may receive a request for a session through a server, say the server 1112-1, that is initially connected with the client device 1102-1. Thereafter, the session broker module 1116 initializes the extensible API 1118 associated with the plug-in(s) 1114.

At block 1504, a function call 'GetUserDisconnectedSession' is made to obtain a session. In one implementation, the server 1112-1 acting as a redirector for the client device 1102-1 may make the function call to the session broker server 1108. The session broker module 1116 of the session broker server 1108 receives the function call and informs the extensible API 1118 of the function call.

At block 1506, a function call 'GetUserExternalSession' is made in response to a call 'GetMostSuitableServer'. The session broker module 1116 may send the server function call made by the redirecting server 1112-1 to the extensible API 1118. The extensible API 1118 upon receipt of this server function call may call the function call 'GetMostSuitableServer' that may initiate the session broker module 1116 to identify a suitable server, for example, any server out of the servers 1112 or the external server 106, to which the client device 1102-1 can be redirected.

At block 1508, the server ID associated with the suitable server is collected. The session broker module 1116 gathers the server ID of the suitable server in the remote access system environment.

At block 1510, the server ID of the suitable server is validated. In one implementation, the session broker module 1116 may check the registry 1208 to identify whether the server ID is present in the registry 1208 or not and also checks whether the server ID relates to the suitable server.

In another implementation, the session broker module 1116 may determine whether the suitable server having the server ID is in drain mode or not. If the suitable server is in drain mode, the suitable server may deny any new remote logon from other users. Further, in such a condition, the users in the remote access system environment having existing session with the servers may be reconnected. In yet another implementation, the session broker module 1116 may check whether the suitable server having the desired server ID has crossed the maximum number of sessions allocated to suitable server.

At block 1512, a determination is made whether the server ID is valid or not. If the server ID is valid (i.e., the "YES" path from block 1512), the client device 1102-1 is redirected to establish a connection with the suitable server at block 1514. If the server ID is not valid (i.e., the "NO" path from block 1512), a plug-in error event is logged. For example, a warning is logged when the function call 'WTSSBX_GetMostSuitableServer' called by the extensible API 1118 returns an invalid server ID.

In another scenario, if the function call 'WTSSBX_GetMostSuitableServer' redirects the client device 1102-1 to the suitable server in drain mode, the plug-in error event is logged as a warning. Similarly in yet another scenario, a plug-in error event is logged when the function call 'WTSSBX_GetMostSuitableServer' provides the suitable server that has violated a predefined session limit.

At block 1518, a suitable server is identified from a list of servers having their corresponding weights. The session broker module 1116 may employ a load balancing algorithm to assign weights to each server in the remote access system environment based on the number of sessions handled by each server. The session broker module 1116 generates a list of servers and identifies a suitable server from the list. The server identified may possess a lesser number of sessions and thus shows the capability of providing a session to the client device 1102-1. At block 1520, the client device 1102-1 is redirected to establish a connection with the identified server.

Platform and API for TSV Virtualization

Figure 16:
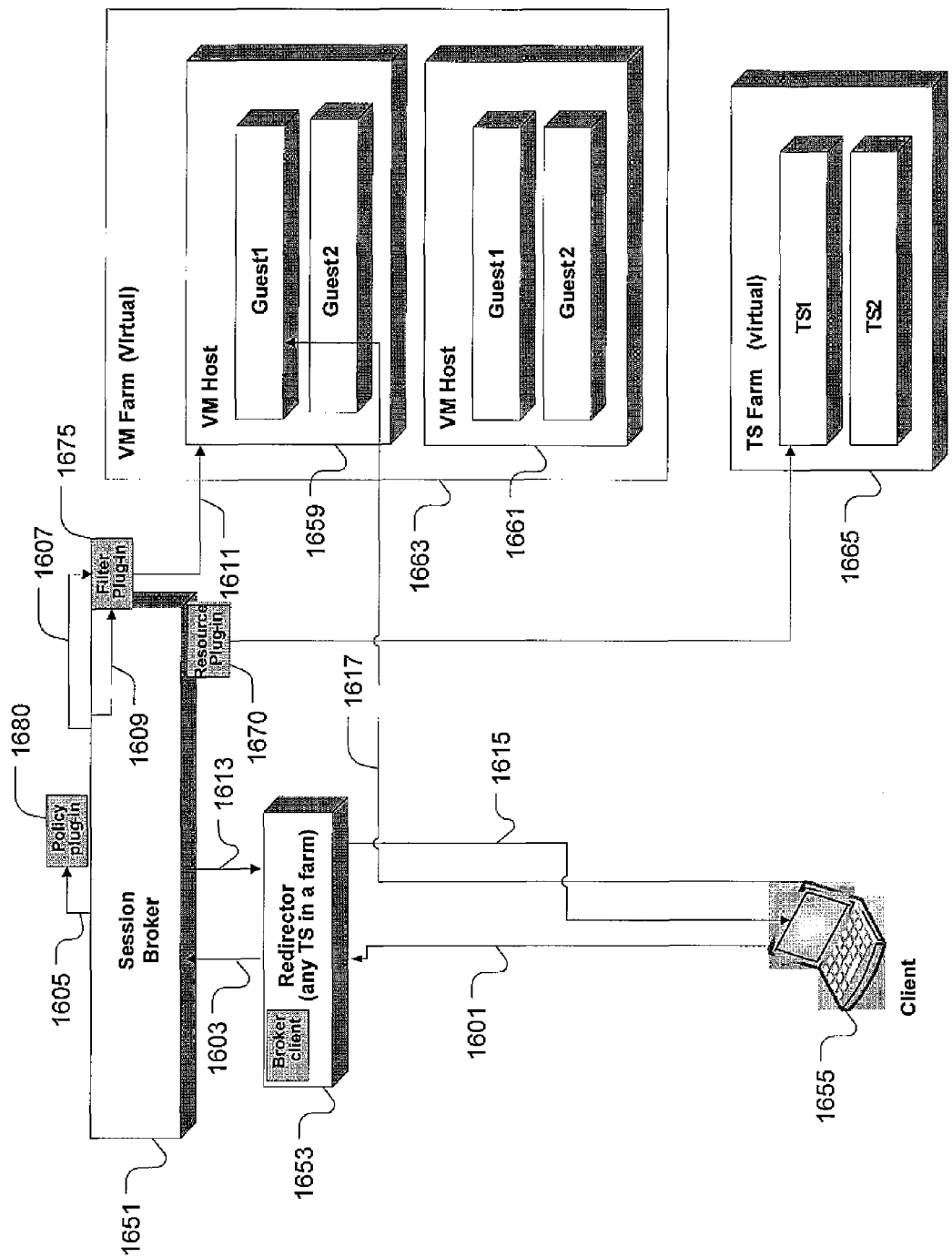
FIG. 16 is a functional block diagram illustrating aspects of a platform for enabling terminal services virtualization.

The following exemplary description of an API for TSV may be better understood in conjunction with the exemplary functions provided in the Appendix. Referring to FIG. 16, depicted is a client 1655, redirector 1653, a session broker 1651, virtual machine farm 1663 and terminal server farm 1665. The terminal service client 1655 may connect to a terminal server redirector 1653 which in turn may contact the session broker 1651 through an RPC call. The redirector 1653 may be a component that acts as a proxy for an RDP connection to communicate with session broker 1651 in order to send back a redirection packet to the terminal service client 1655. The session broker 1651 is the component that may handle load balancing and redirection of terminal service sessions and invoke a policy plug-in to determine an appropriate end point.

A plug-in may, for example, be a software object such as a Component Object Model (COM) based dynamic link library (DLL). Typically, only administrators can install resource and filter plug-ins, for security purposes. The following interfaces may be implemented by plug-ins and supported by the session broker: (1) Resource, (2) Policy, (3) Filter Resource, (4) Load Balancing, (5) Placement, and (6) Orchestration. Plug-ins may implement one or more of these interfaces. A plug-in that implements one of these interfaces may further determine the type of resource that may be managed, such as terminal server farm resources, virtual machine resources, or other resources. A filter plug-in may implement load balancing, placement, and orchestration interfaces invoked during connection time. A resource plug-in manages a farm in addition to implementing balancing, placement, and orchestration interfaces. Thus, a resource plug-in implements various other interfaces that relate to farm management. The session broker may manage the plug-ins as follows:

1. A single plug-in may manage multiple resource types (terminal server, virtual machine, etc.).

2. Multiple plug-ins can manage a single resource type (terminal server, virtual machine, etc.).

3. While the scenario where multiple plug-ins manage a single resource type and identical farms may be discouraged (for example, a "Citrix Terminal Server Plug-in" and "Microsoft Terminal Server Plug-in" should not manage the same farm), the policy plug-in may be responsible to determine which of these plug-ins should actually be used.

Plug-ins may be loaded when session broker service is initiated. In some embodiments, plug-ins may be dynamically loaded at run-time. Plug-ins may further register under a registry key. Each subkey may be enumerated by the session broker and treated as a plug-in.

The endpoint may be a virtual machine farm, a personal desktop or a terminal server. The client may connect to this final endpoint. While the above process is described in terms of a farm scenario, the principles may be applied to other embodiments.

Returning to FIG. 16, a terminal server client 1655 may connect 1601 to a redirector terminal server 1653 that can reside either on the session broker machine or a dedicated machine. The redirector terminal server 1653 may call 1603 the session broker 1651 to request a redirection packet in order to redirect the client 1655 to a final destination terminal server or virtual machine.

The session broker 1651 may call 1605 the policy plug-in 1680 to determine which farm or personal desktop the user should be redirected to. A policy plug-in determines the target farm (or machine) for the client requested connection. The policy plug-in may implement an assignment policy or other policies. The policy plug-in 1680 may return at least two pieces of information:

(a) The name of the farm or personal desktop. In some embodiments an indication that the returned name identifies a farm may be included.

(b) The identification of a resource plug-in that should handle the redirection decision for the returned farm. The resource plug-in determines the most suitable machine within the farm to send the connection to, prepares the machine or image, and/or prepares the machine to receive the connection.

If the endpoint is a personal desktop (PD), the policy plug-in may communicate to a central publishing service which in turn communicates with an Active Directory (AD) to obtain assigned personal desktops to a user using an updated AD schema for personalized desktops in TSV scenarios.

The session broker 1651 may call 1609, 1607 at least one filter plug-in 1670 and/or a resource plug-in 1675 identified by the policy described above. A filter plug-in may be a third party plug-in that can override some of the load balancing, placement, and orchestration functions of a resource plug-in. Filter plug-ins may also be loaded without resource plug-ins. In some embodiments, a filter plug-in may be implemented with the resource plug-in functions. Resource plug-ins may implement all of the resource plug-in functions. A resource plug-in may also responsible for reporting host/session state changes to the session broker. When a resource plug-in reports host or session changes to the session broker, notification of the changes may be provided to the filter plug-ins.

Both resource and filter plug-ins may exist independently of each other. For example, in a non-farm case with a single terminal server desktop or personalized virtual machines that are not part of a virtual machine pool, a load balancing decision is not required since the target host is known. Accordingly, it may not be necessary for the session broker to maintain host/session states.

Typically, a resource plug-in may be used when a pool of resources are present—such as virtual machines, terminal servers, and blades in a farm. The plug-in(s) may make a load balancing decision to decide a target host. Since the endpoints are not dedicated to a particular client, the plug-in should also keep track of disconnected or logged off sessions. Such a decision may be driven by the host/session states maintained by the session broker based on the notifications triggered by the resource plug-in to the broker.

Some of the actions of a resource plug-in may be overridden by a filter plug-in. Such actions may comprise four methods: GetMostSuitableTarget, QueryHostEnvironmentForTarget, CreateHostEnvironmentForTarget and PrepareTargetForConnect. Notifications from a resource plug-in cannot be overridden by a filter plug-in. Resource plug-in may notify the session broker about any changes to host/session configurations using the above described methods. Examples of notifications include: "Machine join to a farm" and "user disconnected from a session on a machine." The session broker may thus be able to maintain the host/session states. This state information can be queried by a resource plug-in generally used to make load balancing decisions. A single filter plug-in can override multiple resource plug-ins in the calls for load-balancing, placement, or orchestration A filter plug-in may register with the session broker to receive notifications from the session broker in order to track host/session state changes. The session broker may then forward host or session change notifications to the filter plug-ins whenever a resource plug-in notifies the broker.

The session broker may allow multiple filter plug-ins to implement the same method. To enforce an order in which the filter plug-ins may be called, the filter plug-in may register a priority. In one embodiment this may be a positive integer value. The priority may vary between 1 to N, where 1 is the highest priority and N is the lowest priority, where N=number of filter plug-ins. Each filter plug-in may have an entry in the registry where the priority is entered as a registry sub key.

Continuing with FIG. 16, the session broker 1651 may ask the filter plug-ins and/or the selected resource plug-in for the functions described below. Filter plug-ins may override a resource plug-in for any or all of the below functions. More than one filter plug-in may be loaded. As described above, filter plug-in priority may be enforced by using a integer sub-key in the registry for each plug-in. These integer sub-keys determine the order in which filter plug-ins are called.

a. a most suitable machine to redirect the client to b. whether the machine is ready/placed;

c. place if machine is not already placed (Placement is the process of locating the virtual machine image and making sure it is 'placed' in the right virtual machine host. When an end-user finishes using a VM, that VM is available to be moved off of the VM host into a fileshare or data library. Thus a filter plug-in which implements placement may optionally consider whether the filter should "un-place" or remove the VM when the end-user is finished using the VM.);

d. prepare the identified machine for accepting connections.

Filter plug-ins 1675 and/or resource plug-ins 1670 may respond to the above steps and return an IP address for the selected endpoint machine. In FIG. 16, the filter plug-in 1675 may be the default resource plug-in that performs load balancing and orchestration. The plug-in 1675 may communicate 1611 to a VM host agent on the VM host machine in order to orchestrate the virtual machine and initialize the virtual machine. Orchestration is the process of preparing the machine/VM image to start up a VM, boot up the VM, and accept terminal server connections. The plug-in 1675 may then obtain an IP address using key-value pairs (KVP). KVP may be implemented, for exampled by a hypervisor in Windows™. The IP address may then be returned to the session broker 1651.

The session broker 1651 may send 1613 the target IP address to the redirector 1653. The redirector may then send 1615 a redirection packet to client 1655. Finally, the client 1655 may connect to the IP address received in the redirection packet.

In accordance with the above features, disclosed herein is an application programming interface (API) that provides terminal server session broker extensibility to enable load-balancing and remote desktop connections to various types of machines such as virtual machines, terminal servers, or other types of endpoint entities. The API may be exposed to the above described plug-ins in order to manage a farm of virtual machines, a farm of terminal servers, and the like.

In one embodiment the session broker 1651 may query for GetMostSuitableTarget to determine an endpoint to return to the client. The session broker 1651 may query filter plug-in 1675 to determine if the GetMostSuitableTarget function is implemented. In the example shown in FIG. 16, the filter plug-in 1675 has implemented the function and may inform the session broker 1651. The filter plug-in 1675 may then determine a suitable target and return the target name to session broker 1651. Since filter plug-in 1675 was able to handle the request, session broker 1651 need not query additional filter plug-ins or resource plug-ins to fulfill the GetMostSuitableTarget function.

In another embodiment, the session broker 1651 may query for PrepareTargetForConnect to prepare the identified host environment. The session broker 1651 may query filter plug-in 1675 to determine if the PrepareTargetForConnect function is implemented. In the example shown in FIG. 16, the filter plug-in 1675 has implemented the function and may inform the session broker 1651. Since filter plug-in 1675 was able to handle the request, session broker 1651 need not query additional filter plug-ins or resource plug-ins to fulfill the PrepareTargetForConnect function. This method may be a no-operation in the case of a terminal server farm or terminal server desktops. In the case of a virtual machine farm, filter plug-in 1675 may check if the host environment is ready for a connection. If not, filter plug-in 1675 may prepare the identified host environment for a connection. Filter plug-in 1675 returns the host object to the session broker 1651.

In another embodiment, the session broker 1651 may query for PrepareTargetForConnect to prepare the host for a connection. In the example shown in FIG. 16, the filter plug-in 1675 has implemented the function and may inform the session broker 1651. The filter plug-in 1675 may call the session broker 1651's PrepareTargetForConnect which signals to the broker that the host is ready for connection. Although filter plug-in 1675 can override some processes of a resource plug-in, filter plug-in 1675 is typically not permitted to override processes that signal host related events to the session broker 1651. It is the responsibility of the resource plug-in 1670 to handle such events.

In the case where no filter plug-ins have implemented a requested function, session broker 1651 may query the resource plug-in 1670. Resource plug-in 1670 may monitor host related events and inform the broker about the host related events. Such events may include, for example, AddTargetToStore, AddSessionToStore, and the like.

Generally, the extensibility principles disclosed herein provide for plug-in interoperability in a way that any plug-in can be plugged in as long as they adhere to the API interfaces.

Figure 17:
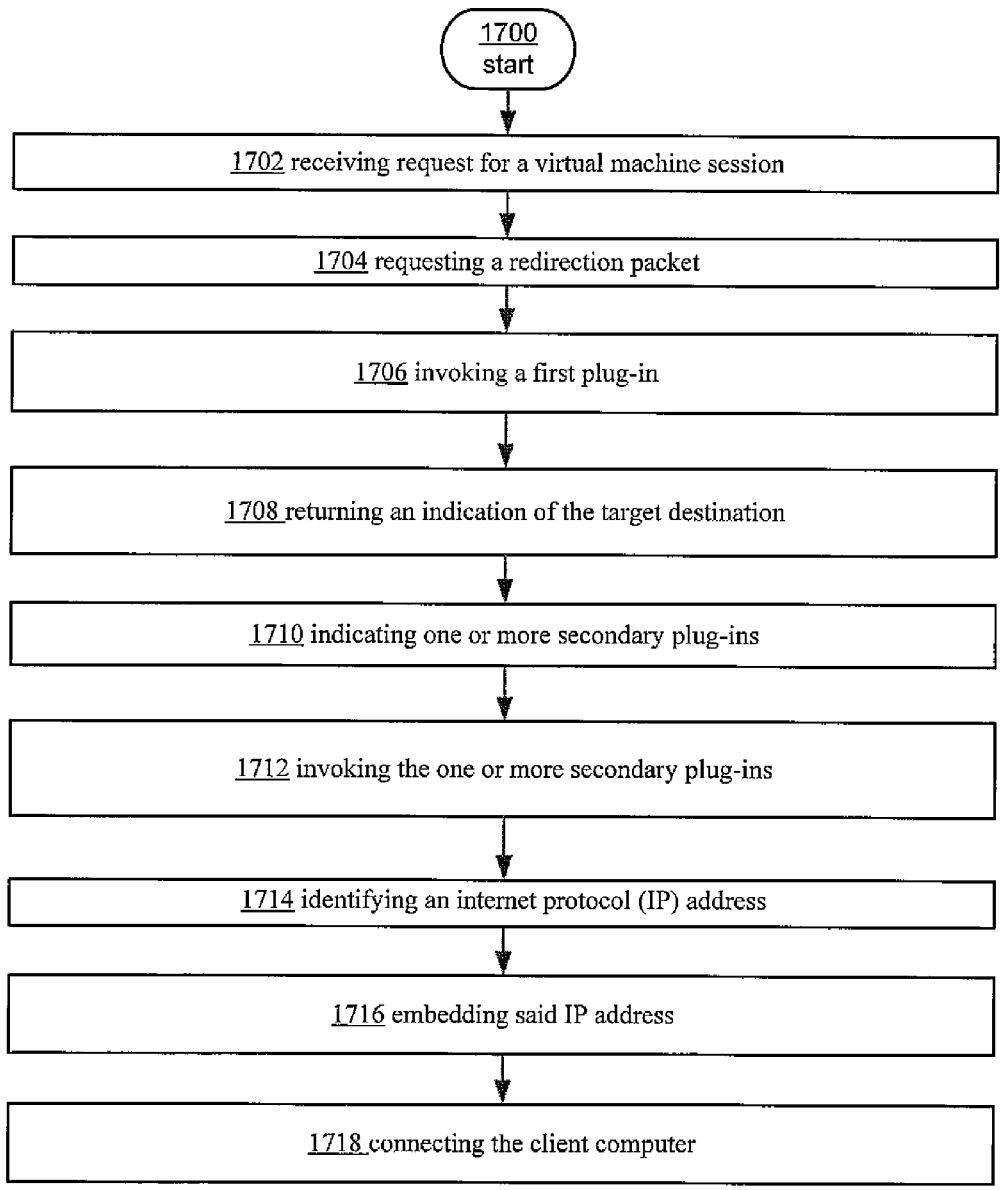
FIG. 17 illustrates an example operational procedure for practicing aspects of the present disclosure.
Figure 18:
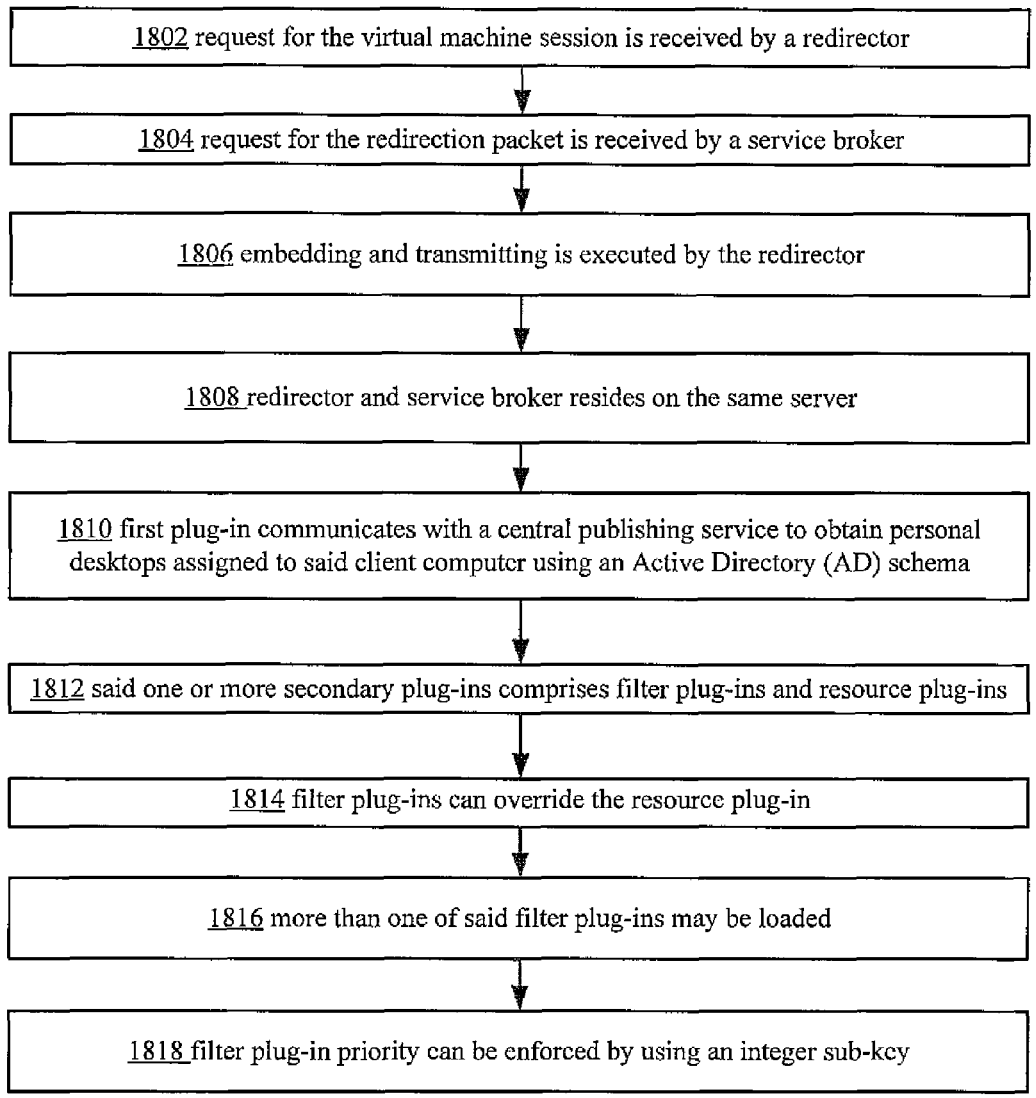
FIG. 18 illustrates an example operational procedure for practicing aspects of the present disclosure.

FIGS. 17 and 18 depict an exemplary operational procedure for connecting a client computer to one of a plurality of virtual machines executing on a plurality of servers including operations 1700, 1702, 1704, 1706, 1708, 1710, 1712, 1714, 1716, and 1718. Referring to FIG. 17, operation 1700 begins the operational procedure and operation 1702 illustrates receiving a request for a remote session. Operation 1704 illustrates receiving at one of said plurality of servers a request from the client computer for a virtual machine session. Operation 1704 illustrates requesting a redirection packet for redirecting the client computer to a target destination. Operation 1706 illustrates invoking a first plug-in for determining the target destination. Operation 1708 illustrates returning an indication of the target destination and operation 1710 illustrates further indicating one or more secondary plug-ins for load balancing and orchestrating said redirecting.

Operation 1712 illustrates invoking the one or more secondary plug-ins and requesting the following: (1) a selected virtual machine; (2) indication of whether the selected virtual machine is instantiated; (3) a location when the selected virtual machine is not instantiated; and (4) preparing the selected virtual machine for accepting a new connection. Operation 1714 illustrates identifying an internet protocol (IP) address for said selected virtual machine and returning the IP address. Operation 1716 illustrates embedding said IP address in said redirection packet and transmitting the redirection packet to the client computer. Operation 1718 illustrates connecting the client computer to one of the plurality of virtual machines based on information contained in the redirection packet.

Figure 19:
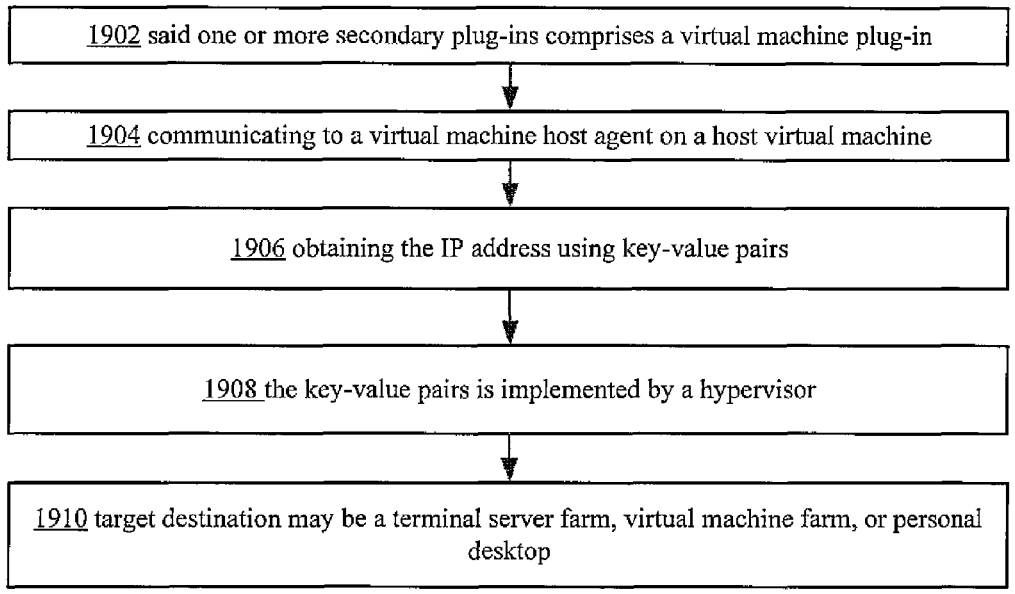
FIG. 19 illustrates an example operational procedure for practicing aspects of the present disclosure.

FIGS. 18 and 19 illustrate further embodiments of the operational procedure of FIG. 17. As is depicted in FIG. 18, operation 1802 illustrates that the request for the virtual machine session is received by a redirector executing on the one of said plurality of servers. Operation 1804 illustrates that the request for the redirection packet is received by a service broker and said IP address is returned to the service broker, the service broker in turn sending the IP address to the redirector. Operation 1806 illustrates that said embedding and transmitting is executed by the redirector.

Operation 1808 illustrates that the redirector and service broker resides on the same server. Operation 1810 illustrates that the selected virtual machine is a personal desktop, the first plug-in communicates with a central publishing service to obtain personal desktops assigned to said client computer using an Active Directory (AD) schema for personalized desktops, wherein the central publishing service communicates with the Active Directory. Operation 1812 illustrates that said one or more secondary plug-ins comprises filter plug-ins and resource plug-ins.

Operation 1814 illustrates that the filter plug-ins can override the resource plug-ins. Operation 1816 illustrates that more than one of said filter plug-ins may be loaded. Operation 1818 illustrates that filter plug-in priority can be enforced by using an integer sub-key in a registry for each filter plug-in, wherein the integer sub-keys determine the order in which filter plug-ins are called.

Continuing with FIG. 19, operation 1902 illustrates that said one or more secondary plug-ins comprises a virtual machine plug-in, wherein the virtual machine plug-in is a default resource plug-in. Operation 1904 illustrates communicating to a virtual machine host agent on a host virtual machine in order to initiate and orchestrate the host virtual machine. Operation 1906 further illustrates obtaining the IP address using key-value pairs. Operation 1908 illustrates that in a further embodiment, the key-value pairs is implemented by a hypervisor. Operation 1910 illustrates that said target destination may be a terminal server farm, virtual machine farm, or personal desktop.

Figure 20:
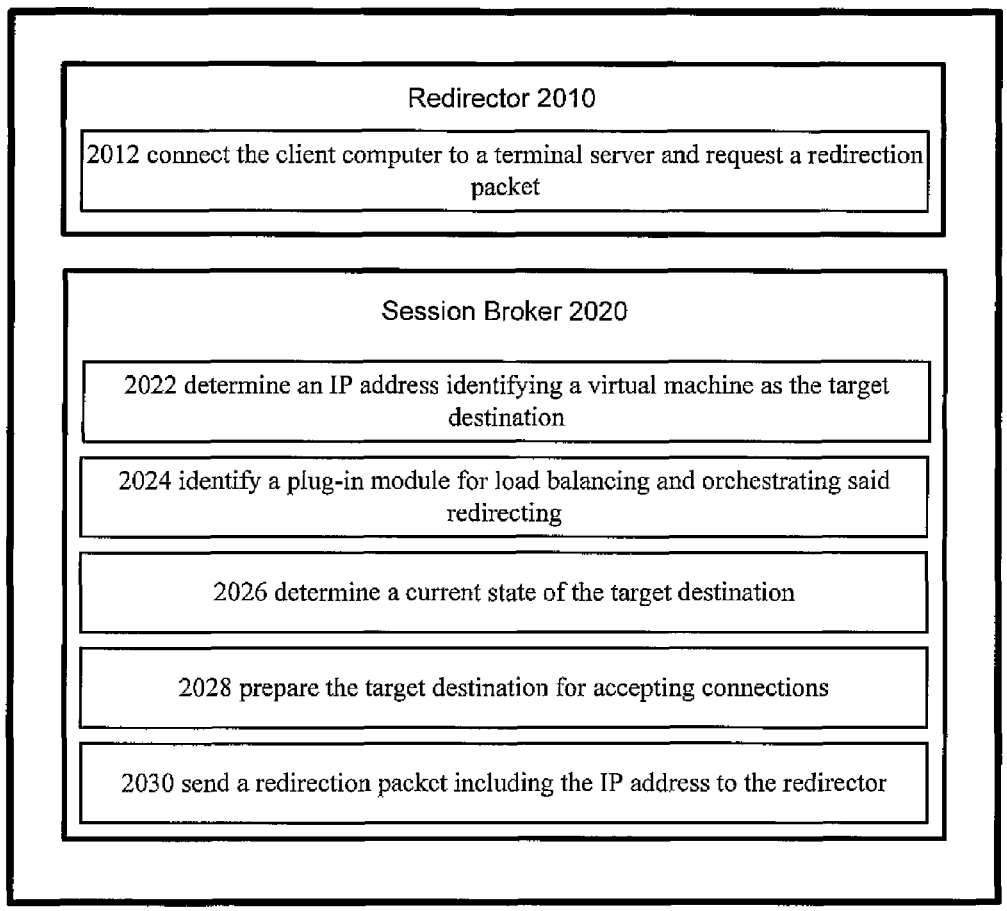
FIG. 20 illustrates an example system and operational procedure for practicing aspects of the present disclosure.
Figure 21:
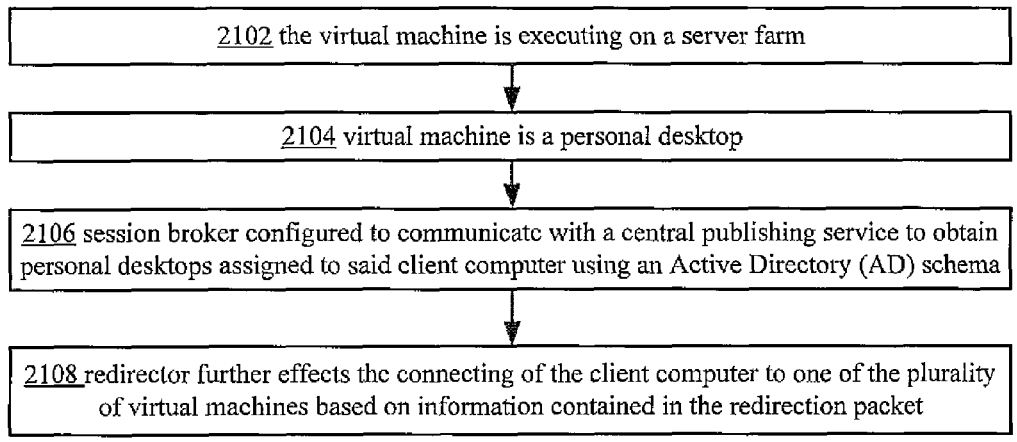
FIG. 21 illustrates an example system and operational procedure for practicing aspects of the present disclosure.
Figure 22:
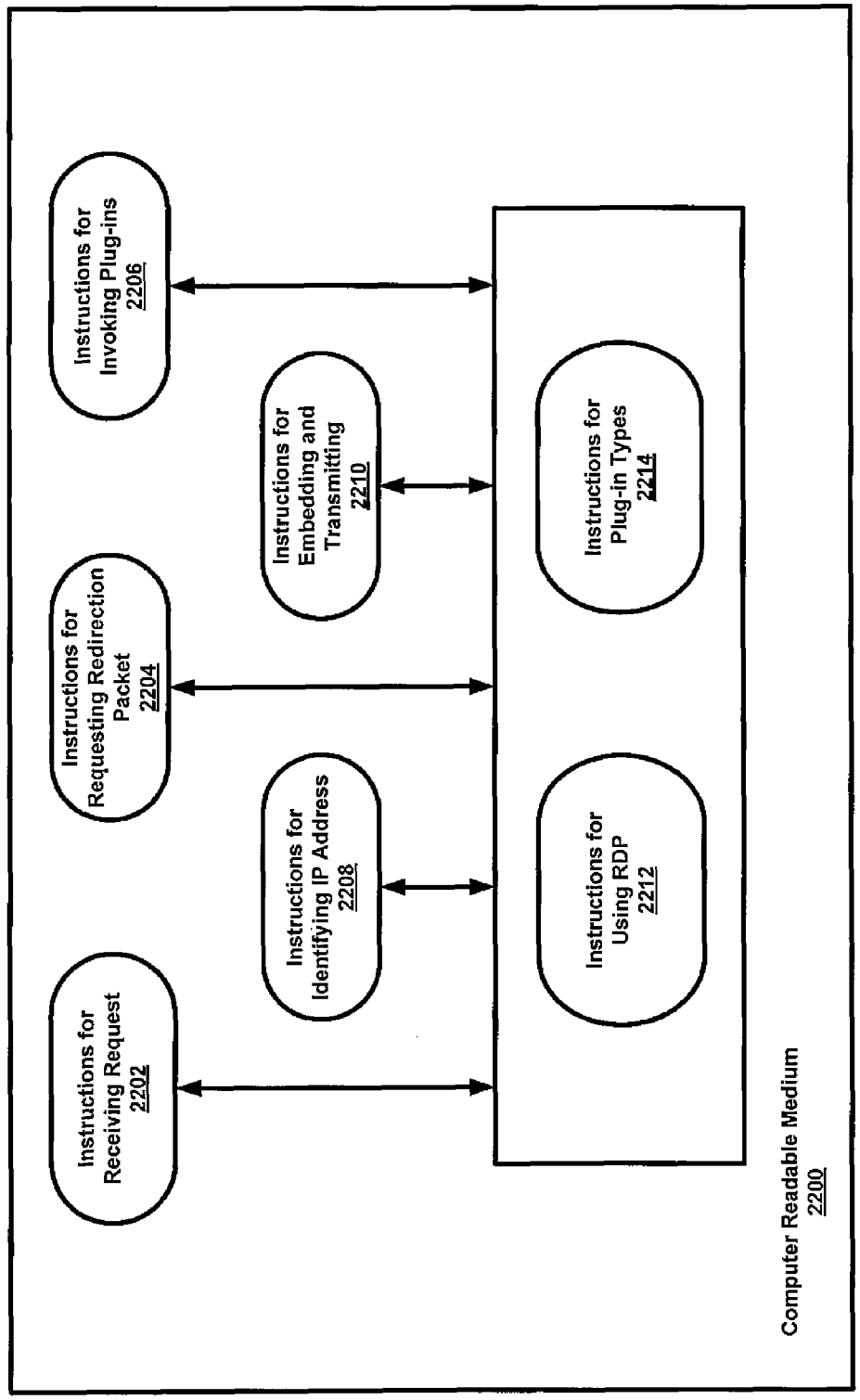
FIG. 22 illustrates a computer readable medium bearing computer executable instructions discussed with respect to FIGS. 1-21 above.

FIGS. 20 and 21 depict an exemplary system and operational procedure for connecting a client computer to one of a plurality of virtual machines executing on a plurality of servers. Referring to FIG. 20, system 2000 comprises a redirector 2010 and session broker 2020. Redirector 2010 is further configured to connect the client computer to a terminal server and request a redirection packet for redirecting the client computer to a target destination. Session broker 2020 is configured to receive said request and communicate with one or more plug-in modules to (2022) determine an IP address identifying a virtual machine as the target destination, (2024) identify a plug-in module for load balancing and orchestrating said redirecting, (2026) determine a current state of the target destination, (2028) prepare the target destination for accepting connections, and (2030) send a redirection packet including the IP address to the redirector Continuing with FIG. 22, system 2000 may further be configured as follows. Operation 2202 illustrates that the virtual machine is executing on a server farm. Operation 2204 illustrates that the virtual machine is a personal desktop and the session broker is further configured to communicate with a central publishing service to obtain personal desktops assigned to said client computer using an Active Directory (AD) schema for personalized desktops. Operation 2206 illustrates that the redirector further effects the connecting of the client computer to one of the plurality of virtual machines based on information contained in the redirection packet.

Any of the above mentioned aspects can be implemented in methods, systems, computer readable media, or any type of manufacture. For example, per FIG. 21, a computer readable medium can store thereon computer executable instructions for connecting a remote client computer to one of a plurality of virtual machines executing on a plurality of servers. Such media can comprise a first subset of instructions for receiving at one of said plurality of servers a request from the client computer for a virtual machine session 2102; a second subset of instructions for requesting a redirection packet for redirecting the client computer to a target destination on said plurality of servers 2104; a third subset of instructions for invoking one or more plug-in modules for determining the target destination, performing load balancing, and orchestrating said redirecting 2106; a fourth subset of instructions for identifying an internet protocol (IP) address for said target destination 2108; and a fifth subset of instructions for embedding said IP address in said redirection packet and transmitting the redirection packet to the client computer 2110. It will be appreciated by those skilled in the art that additional sets of instructions can be used to capture the various other aspects disclosed herein, and that the three presently disclosed subsets of instructions can vary in detail per the present disclosure.

For example, the instructions can further comprise instructions 2112 for implemented said connecting using Remote Desktop Protocol (RDP). The instructions can further comprise instructions for implementing said one or more plug-in modules as policy plug-ins, resource plug-ins, or filter plug-ins 2114.

As described above, aspects of the presently disclosed subject matter may execute on a programmed computer. FIG. 1 and the following discussion is intended to provide a brief description of a suitable computing environment in which the those aspects may be implemented. One skilled in the art can appreciate that the computer system of FIG. 1 can in some embodiments effectuate the server and the client of FIGS. 2-4. In these example embodiments, the server and client can include some or all of the components described in FIG. 1 and in some embodiments the server and client can each include circuitry configured to instantiate specific aspects of the present disclosure.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

FIG. 1 depicts an example of a computing system which is configured to with aspects of the disclosed subject matter. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosed subject matter may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the presently disclosed subject matter are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects and embodiments of the subject matter described herein have been shown and described, it will be apparent to those skilled in the art that, based upon the teachings herein, changes and modifications may be made and, therefore, the appended claims are to encompass within their scope all such changes and modifications as are within the true spirit and scope of the subject matter described herein.

What is claimed:

1. In a system for enabling connections between a client computer and at least one of a plurality of virtual machines executing on a plurality of servers, a method comprising:
   receiving at one of said plurality of servers a request to connect the client computer to one of the plurality of virtual machines;
   requesting a redirection packet for redirecting the client computer to connect to a target destination server of the plurality of servers;
   invoking a policy plug-in configured to determine the target destination server and a resource plug-in for processing a redirection decision from the target destination server, the resource plug-in configured to identify one of the plurality of virtual machines to connect to and prepare the identified virtual machine to receive the connection;
   returning an indication of the target destination server and an indication of the resource plug-in and a filter plug-in configured to load balance and orchestrate redirecting across the plurality of virtual machines;
   requesting from the resource plug-in and filter plug in:
      a selected virtual machine, said selected virtual machine chosen by a process comprising load balancing;
      an indication of whether the selected virtual machine is instantiated;
      a location of the selected virtual machine when the selected virtual machine is not instantiated; and
      preparation of the selected virtual machine for accepting a new connection;
   identifying an internet protocol (IP) address for said selected virtual machine and returning the IP address;
   embedding said IP address in said redirection packet and transmitting the redirection packet to the client computer; and
   connecting the client computer to one of the plurality of virtual machines based on information contained in the redirection packet.

2. The method of claim 1 wherein:
   the request is received by a redirector executing on the one of said plurality of servers;
   the request for the redirection packet is received by a session broker and said IP address is returned to the session broker, the session broker in turn sending the IP address to the redirector; and
   said embedding and transmitting is executed by the redirector.

3. The method of claim 2 wherein the redirector and session broker resides on the same server.

4. The method of claim 2, wherein said resource plug-in manages one or more server farms via one or more application programming interfaces (APIs) provided by the session broker.

5. The method of claim 4, wherein the filter plug-ins can override the resource plug-ins.

6. The method of claim 4, wherein more than one of said filter plug-ins may be loaded and the filter plug-ins can register for target, session, and connection notifications using the one or more APIs.

7. The method of claim 6, wherein filter plug-in priority can be enforced by using an integer sub-key in a registry for each filter plug-in, wherein the integer sub-key determines the order in which filter plug-ins are called.

8. The method of claim 4, wherein said one or more secondary plug-ins comprises a virtual machine plug-in, wherein the virtual machine plug-in is a default resource plug-in.

9. The method of claim 8, further comprising communicating to a virtual machine host agent on a host virtual machine in order to initiate and orchestrate the host virtual machine.

10. The method of claim 9, further comprising obtaining the IP address using key-value pairs implemented by a hypervisor.

11. The method of claim 1, wherein when the selected virtual machine is a personal desktop, the filter plug-in communicates with a central publishing service to obtain personal desktops assigned to said client computer using an Active Directory (AD) schema for personalized desktops, wherein the central publishing service communicates with the Active Directory.

12. The method of claim 1, wherein said invoking further comprises determining whether the filter should remove the selected virtual machine when the client computer is finished using the selected virtual machine.

13. The method of claim 1, wherein said target destination server may be a terminal server farm, virtual machine farm, or personal desktop.

14. A system configured to connect a client computer to one of a plurality of virtual machines executing on a plurality of servers, comprising:
  at least one processor; and
  at least one memory communicatively coupled to said at least one processor, the memory having stored therein computer-executable instructions for implementing:
    a redirector configured to connect the client computer to a terminal server and request a redirection packet for redirecting the client computer to a target destination server from the plurality of servers; and
    a session broker configured to:
      apply a policy indication, said policy indication comprising criteria for selecting suitable target virtual machines; and
      receive said request and communicate with one or more plug-in modules configured to: (1) determine an internet protocol (IP) address identifying a target virtual machine destination, (2) identify a resource plug-in configured to apply a redirection indication from the target destination server identifying the target virtual machine destination, and prepare the target virtual machine destination for accepting connections, and filter plug-ins configured to load balance and orchestrate said redirecting across the plurality of virtual machines, (3) determine a current state of the target virtual machine destination, (4) send a redirection packet including the IP address to the redirector, and (5) override session broker logic for selecting suitable target virtual machines.

15. The system of claim 14, wherein the virtual machine is executing on a server farm.

16. The system of claim 14, wherein the virtual machine is a personal desktop and the session broker is further configured to communicate with a central publishing service to obtain personal desktops assigned to said client computer using an Active Directory (AD) schema for personalized desktops.

17. The system of claim 14, wherein the redirector further effects the connecting of the client computer to one of the plurality of virtual machines based on information contained in the redirection packet.

18. A computer readable storage device storing thereon computer executable instructions for enabling connection of a remote client computer to one of a plurality of virtual machines executing on a plurality of servers, comprising instructions for:
  receiving, by at least one of said plurality of servers, a request to connect the remote client computer to one of the plurality of virtual machines;
  requesting a redirection packet for redirecting the client computer to connect to a target destination on said plurality of servers;
  invoking a resource plug-in for processing a redirection decision from the target destination and a filter plug-in to determine the target destination on said plurality of servers, perform load balancing, and orchestrate said redirecting across the plurality of virtual machines, the resource plug-in configured to identify one of the plurality of virtual machines to connect to and prepare the identified virtual machine to receive the connection;
  identifying an internet protocol (IP) address for said target destination; and
  embedding said IP address in said redirection packet and transmitting the redirection packet to the remote client computer.

19. The computer readable storage device of claim 18, wherein said connection is implemented using Remote Desktop Protocol (RDP).

20. The computer readable storage device of claim 18, further comprising invoking policy plug-ins.

* * * * *